United States Patent [19] [11] 4,099,427
Fickelscher [45] Jul. 11, 1978

[54] PLANETARY GEARING

[75] Inventor: Kurt Gerhard Fickelscher, Frankenthal, Germany

[73] Assignee: Balcke-Durr AG, Ratingen, Fed. Germany

[21] Appl. No.: 731,532

[22] Filed: Oct. 12, 1976

[30] Foreign Application Priority Data

Oct. 11, 1975 [DE] Fed. Rep. of Germany ....... 2545681
Nov. 14, 1975 [DE] Fed. Rep. of Germany ....... 2551083
Apr. 24, 1976 [DE] Fed. Rep. of Germany ....... 2617951

[51] Int. Cl.$^2$ ............................................. F16H 1/28
[52] U.S. Cl. ......................................... 74/804; 74/640
[58] Field of Search ........................... 27/804, 805, 640

[56] References Cited

U.S. PATENT DOCUMENTS

| 2,666,345 | 1/1954 | Amberg | 74/804 |
| 2,983,162 | 5/1961 | Musser | 74/804 X |
| 3,043,164 | 7/1962 | Sundt | 74/805 X |
| 3,147,640 | 9/1964 | Musser | 74/804 X |
| 3,789,700 | 2/1974 | Cotreau et al. | 74/804 X |

Primary Examiner—Leonard H. Gerin
Attorney, Agent, or Firm—Herbert L. Lerner

[57] ABSTRACT

Planetary gearing includes a toothed gear, a pair of toothed central gear meshing with the toothed planet gear and having a respectively different number of teeth forming virtual tooth rows one with the other, and a cam disc rotatable about an axis and operatively connected with the toothed planet gear for guiding and driving the same, all of the gears having teeth of substantially triangular cross section and flat tooth flanks, each of the virtual tooth rows having tooth gap points disposed on a closed virtual addendum curve having a center of mass located on the axis of rotation of the cam disc, the teeth of the planetary gear flatly engaging on both sides thereof the flanks of at least one of the virtual tooth rowa, the one virtual tooth row having a pitch equal to that of the tooth row of the planet gear so that, in a limiting case, all of the teeth except for the difference in the numbers of teeth of the central gears are in force-transmitting engagement.

44 Claims, 38 Drawing Figures

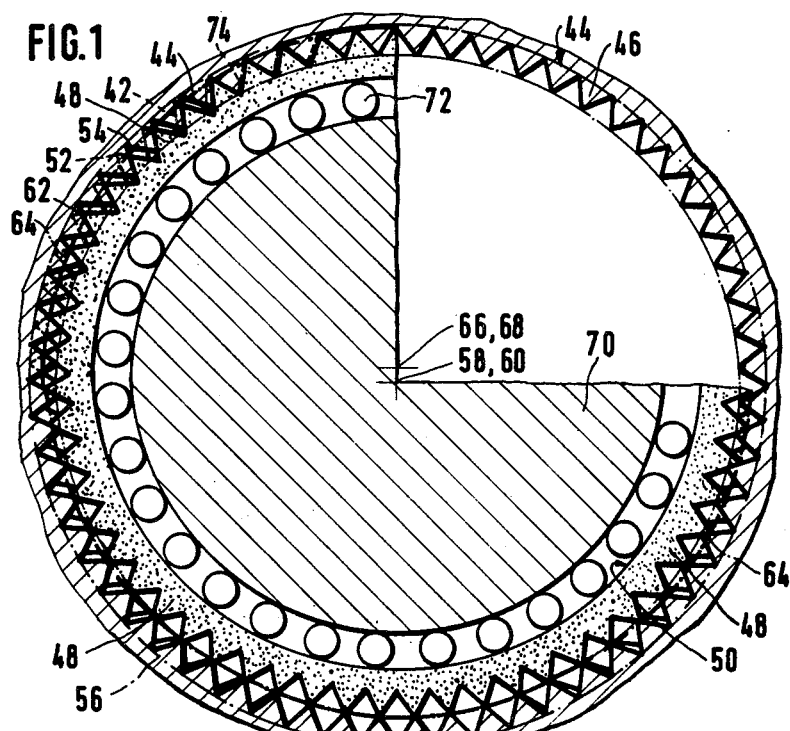
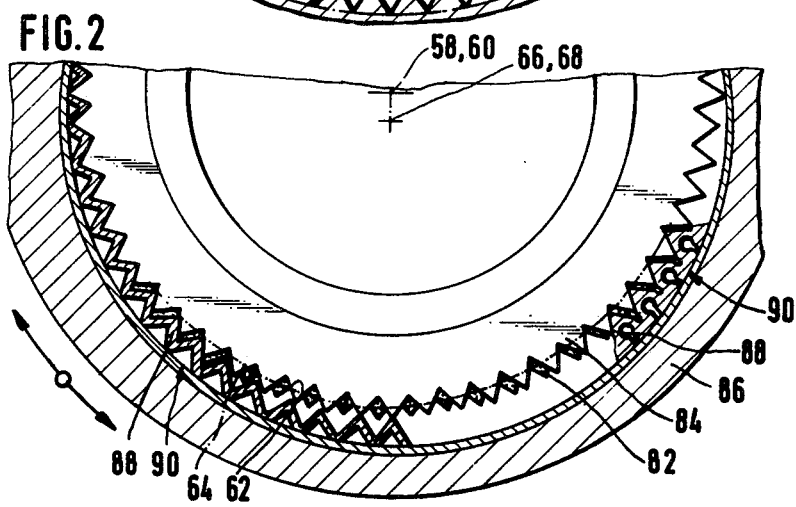

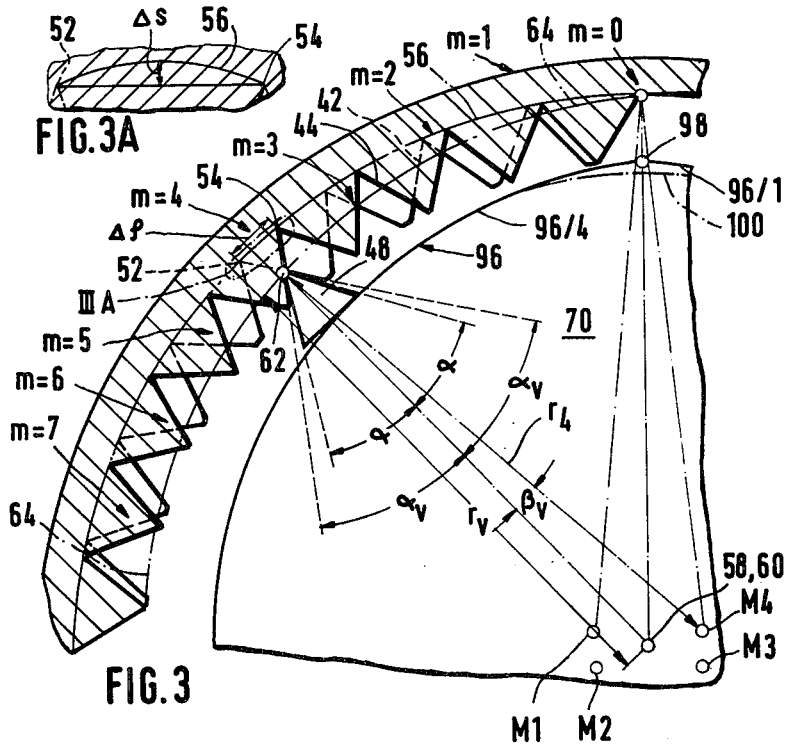
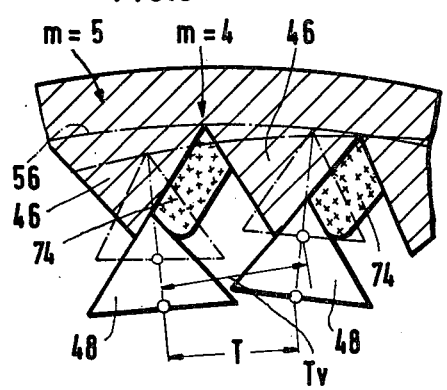
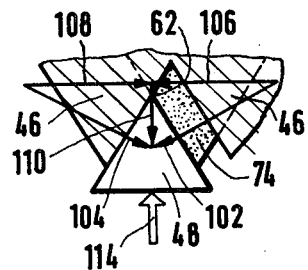

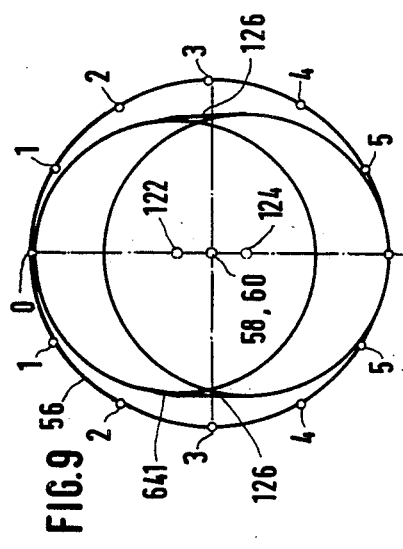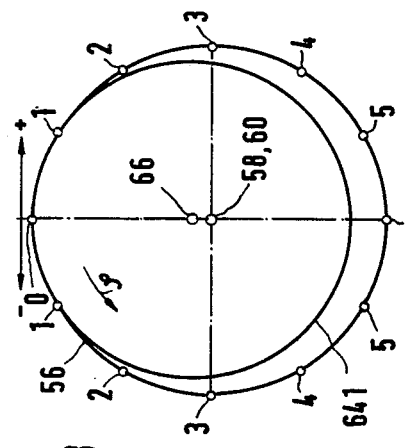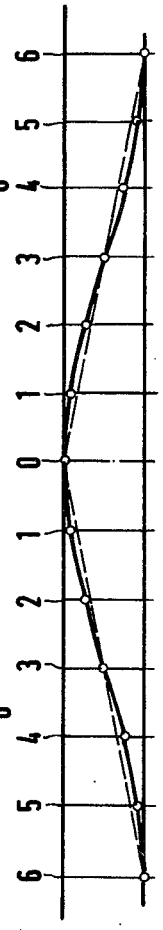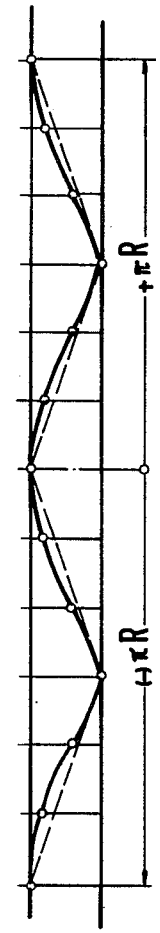

FIG.16
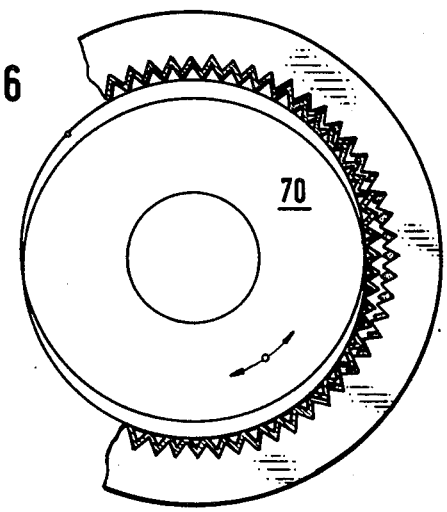
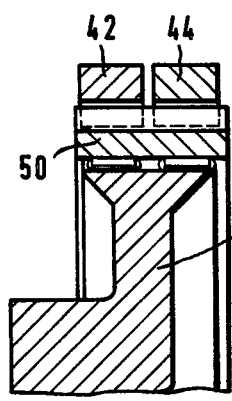
FIG.17A
$Z_{42}=80$  $Z_{44}=78$  $Z_{50}=79$
FIG.17
| | | | |
|---|---|---|---|
| 70 ↑ | 42 | 44 | ↑ 39 |
| 70 ↑ | 44 | 42 | ↑ 40 |
| 70 ↑ | 50 | 44+42 | ↑ 39 − 40 ↑ |
| 70 | 50 | 44+42 | $M_{D1} \cdot n_1 = M_{D2} \cdot n_2$ |
| 70 ↑ | 42 | 50 | ↑ 78 |
| 70 ↑ | 44 | 50 | ↑ 80 |
| 42 | − | 44 | |
| 42 ↑ | 70 | 44 | ↑ 1,025 |
| 44 ↑ | 70 | 42 | ↑ 0,975 |

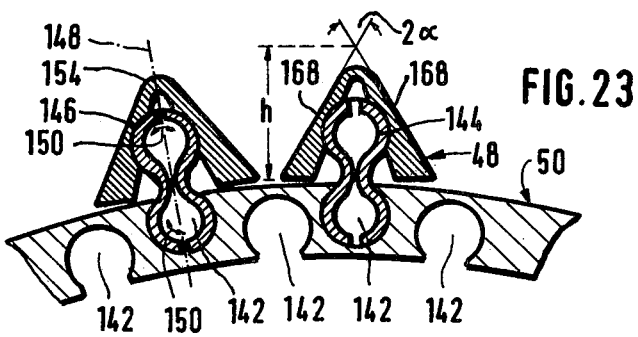
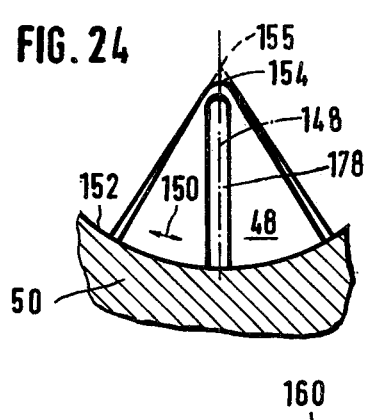
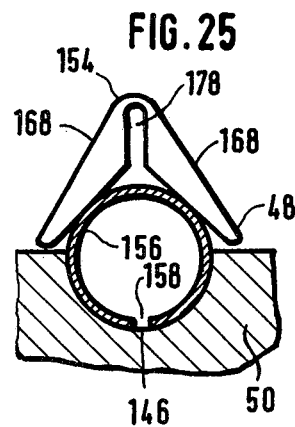
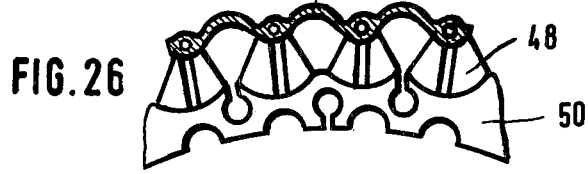
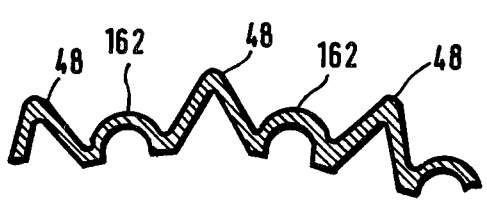

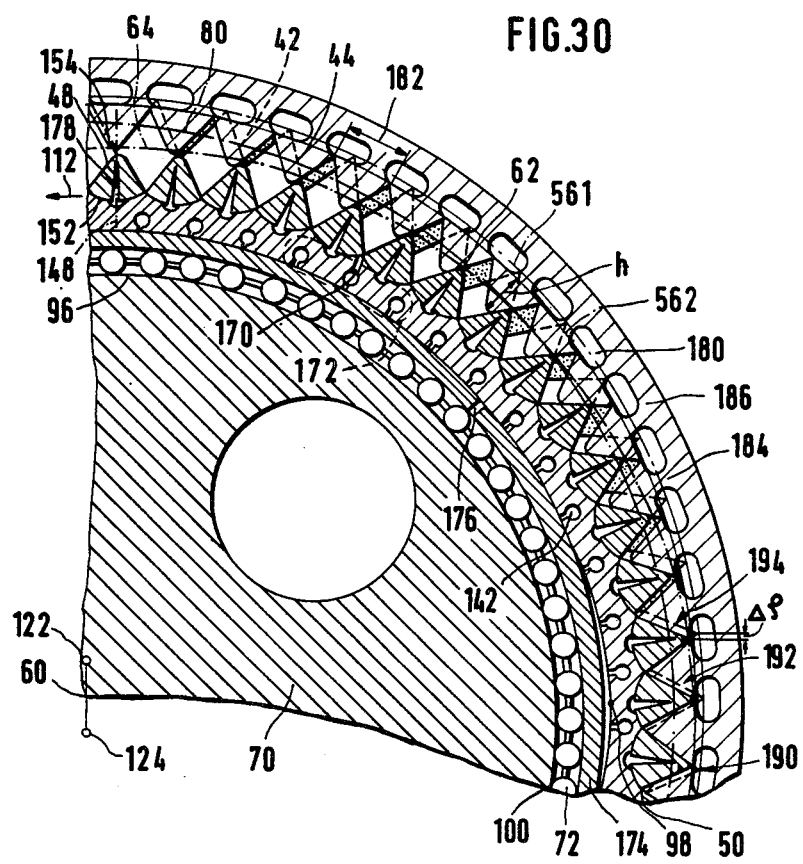

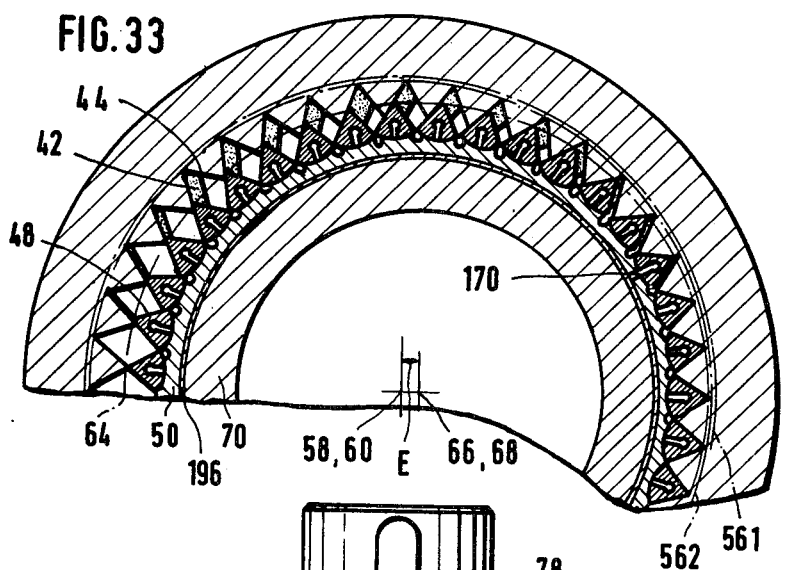
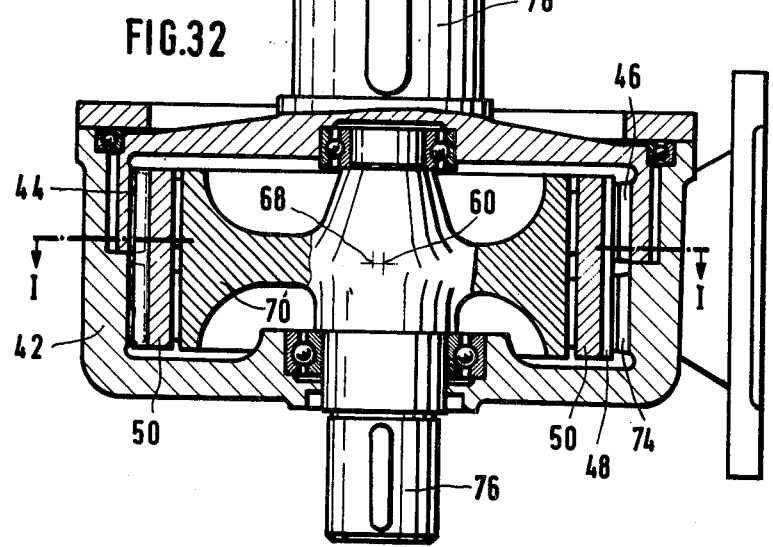

PLANETARY GEARING

The invention relates to planetary gearing with two internally toothed central gears with different numbers of internal teeth, which form virtual tooth rows with one another and with an externally toothed planet gear which meshes with the central gears and is guided and driven by a cam disc.

Such planetary gearing has become known heretofore from German patent DT-PS No. 929,771. In this heretofore known planetary gearing, a maximum of two teeth of the planet gear meshes with the virtual tooth row. The involute toothing conventional with planetary gearing effects a rolling on one another of the teeth that are in engagement and thereby the transmission of forces only in one contacting line, respectively. In accordance with the invention, on the other hand, almost all of the teeth of the planet gear mesh with virtual tooth gaps and are in areally or flatly adjacent engagement in order:

(a) to be able to transmit greater torque for the same dimensions of the gearing or (b) to be able to construct smaller gearing for the same transmitted torque.

In considering the known state of the art through the most varied planetary gearing, applicant adopted as his objective to provide planetary gearing of relatively simple construction, that is relatively easy and economical to produce and which especially makes no demands on high manufacturing precision.

It is also an object of the invention to provide such planetary gearing which will be operationally reliable for the most varied fields of use, high and low gear reductions, large and small rotary speeds, as well as high and low torques.

It is particularly an object of the invention to provide such planetary gearing wherein the transmission of torque to the planet gear is avoided and, in the limiting or extreme case, to maintain all teeth of the planet gear in force-transmitting areal or flat contact with virtual tooth gaps, up to the difference in the number of teeth. Furthermore, the following advantages over heretofore known planetary gearing are achieved by the planetary gearing of the invention:

(1) The planetary gearing according to the invention can transmit considerably higher torque than prior-art gearing of the same dimensions and weight.

(2) The resultant force acting upon each invidual tooth of the planet gear is disposed perpendicularly to the periphery of the planet gear. The result thereof is:

(a) that the individual teeth of the planet gear are independent of one another, (b) that the planet gear is not stressed in torque or bending load, (c) that the planet gear can be yieldably or resiliently constructed without having to be supported by the cam disc and without having to be held in the form wherein it engages in the virtual tooth row; in accordance with the invention, contrarily, the virtual tooth row determines the form of the planet gear or, if the planet gear is yieldable or resilient, the virtual tooth row impresses the form of the planet gear.

(3) The planetary gearing according to the invention is not reversible but is rather self-locking. Heretofore known gearing were not reversible due to self-locking i.e. it had a high tooth friction and bearing friction and accordingly a poor efficiency; the gearing according to the invention is not reversible due to the kinematic principle thereof (note hereinbelow the description respecting FIG. 4) and simultaneously possesses a high efficiency.

(4) The planetary gearing according to the invention operates without play between the tooth flanks of the teeth of the internally toothed (or externally toothed) central gears, on the one hand, and of the planet gear, on the other hand, and with uniform rotary speeds (without angular acceleration).

(5) The planetary gearing is suited in single-stage construction for gear reductions of between substantially 10 and 300.

(6) The individual parts of the planetary gearing according to the invention center one another i.e. they are "self-centering".

(7) All of the foregoing advantages are attainable with relatively simply constructed and relatively simply manufacturable planetary gearing.

With the foregoing and other objects in view and in order to attain the foregoing advantages, there are provided, in accordance with the invention, four constructions or main embodiments that are based upon the same kinematic principle:

A. In planetary gearing with two internally toothed central gears having different numbers of internal teeth which form virtual tooth rows with one another and with an externally toothed planetary gear that meshes with the central gears and is guided and driven by a cam disc, there is provided in accordance with the invention, that all of the teeth have a substantially triangular cross section and flat or planar tooth flanks, that the points of the tooth gaps of each virtual tooth row lie on a closed curve ("virtual addendum curve" or "virtual crown curve"), the center of mass of which lies on the rotary axis of the cam disc, that the external teeth of the planet gear areally or flatly engage on both sides thereof at least one virtual tooth row and that the pitch or spacing of the virtual tooth row is equal to the pitch or spacing of the tooth row of the planet gear so that, in the limiting or extreme case, all of the teeth up to the difference in the number of teeth of the central gears, are in force-transmitting engagement.

B. In the construction of German Patent DT-PS No. 929,771, the cam disc is disposed internally, the planet gear surrounds the cam disc and the central gear surrounds the planet gear. In accordance with another embodiment of the invention, planetary gearing is provided wherein the cam disc driving the planet gear lies externally and the planet gear surrounds the central gears which are provided with an external toothing instead of an internal toothing. In conformity with German Patent DT-PS No. 929 771, the planetary gearing according to the invention of the instant application has two toothed central gears with different numbers of teeth which form virtual tooth rows one with the other and with a toothed planet gear that meshes with the central gears and is guided and driven by a cam disc; in accordance with the invention, in this planetary gearing, the internally toothed planet gear surrounds the externally toothed central gears and is guided and driven from the outside by the cam disc; all of the teeth have a substantially triangular cross section and planar or flat tooth flanks; the tooth gap points of each virtual tooth row lies on a closed curve ("virtual addendum curve" or "virtual crown curve"), the center of mass of which lies on the rotary axis of the cam disc; the external teeth of the planet gear on both sides thereof, areally or flatly engage at least one virtual tooth row and the pitch of the virtual tooth row is equal to the pitch of the tooth row of the planet gear so that, in the limiting or extreme case, all of the teeth, up to the difference in the number of teeth of the central gears, are in force-transmitting engagement.

C. Furthermore, the embodiment of the invention specified only for two central gears under the preceding point (A.) is also applicable to any selected number of central gears; such planetary gearing having internally toothed central gears of different numbers of internal teeth which form virtual tooth rows one with the other, and with an externally toothed planet gear that meshes with the central gears and is guided and driven by a cam disc includes the features that more than two central gears are disposed coaxially in succession or series, that all of the teeth have a substantially triangular cross section and flat or planar tooth flanks, that the tooth gap points of each virtual tooth row lies on a closed curve ("virtual addendum curve" or "virtual crown curve"), the center of mass of which lies on the rotary axis of the cam disc, that the external teeth of the planet gear, on both sides thereof, areally or flatly engage at least one virtual tooth row and that the pitch or spacing of the virtual tooth row is equal to the pitch or spacing of the tooth row of the planet gear so that, in the limiting or extreme case, all of the teeth, up to the difference in the number of teeth of the central gears, are in force-transmitting engagement.

D. Finally, the embodiment of the invention specified only for two externally toothed central gears is also applicable to central gears having any desired number of external teeth and being surrounded by an internally toothed planet gear. Such planetary gearing having toothed central gears of different numbers of teeth which form virtual tooth rows one with the other and with a toothed planet gear that meshes with the central gears and is guided and driven by a cam disc includes the features that more than two central gears are disposed coaxially in succession or series, that the internally toothed planet gear surrounds the externally toothed central gears and is guided and driven from the outside by the cam disc, that all of the teeth have a substantially triangular cross section and flat or planar tooth flanks, that the tooth gap points of each virtual tooth row lies on a closed curve ("virtual addendum curve" or "virtual crown curve"), the center of mass of which lies on the rotary axis of the cam disc, that the external teeth of the planet gear, on both sides thereof, areally or flatly engage at least one virtual tooth row and that the pitch or spacing of the virtual tooth row is equal to the pitch or spacing of the tooth row of the planet gear so that, in the limiting or extreme case, all of the teeth, up to the difference in the number of teeth of the central gears, are in force-transmitting engagement.

By the term "center of mass of the virtual addendum (or crown) curve", it is meant that point in which the flat surface or area enclosed by the virtual addendum curve must be supported in order to be in equilibrium.

The number of teeth of the planet gear is meaningless for the size of the reduction ratio, in every case, it is at most equal to the number of teeth of the used virtual tooth row. From the requirement that the teeth of the planet gear, on both sides thereof, engage the flanks of at least one virtual tooth row, there results ordinarily that the number of teeth of the planet gear lies between the numbers of teeth of the central gears, provided for example, that not only every second tooth of the planet gear is available or a smaller number of teeth is sufficient for transmitting a very low torque.

Hereinbefore, "virtual tooth rows", "at least one virtual tooth row" and "the used virtual tooth row" were discussed. In this regard, it should be stated that the tooth rows of $x$ central gears having varying numbers of teeth form at least $x$ virtual tooth rows through overlapping; moreover, the number of the virtual tooth rows depend also upon the difference $\Delta Z$ of the numbers of teeth of the central gears. If there are, for example, two central gears with $\Delta Z = 2$, then two virtual tooth rows exist. In principle, it is immaterial as to with which of the various virtual tooth rows, the teeth of the planet gear meshes; according to which of two virtual tooth rows is used, the sense of rotation is different for the same fixedly held central gear.

Whenever reference is made hereinafter to "the" virtual tooth row, there is meant thereby that one of the virtual tooth rows that are formed which is used. The choice is competely free. Depending upon the formation or development of the cam disc (singly eccentric or many-times eccentric), several virtual tooth rows can also be used simultaneously.

If the planetary gearing, for example, has three central gears with varying numbers of teeth, of which one of the central gears is held fast, two different rotary speeds can thus be taken off at both of the other central gears. If two central gears have the same number of teeth, however, whereas a third central gear is provided with a different number of teeth between those of the first two central gears, the two central gears with the same tooth count thus produce an improved support of the teeth of the planet gear.

The flank angles and the spacings of the virtual tooth gaps vary over the periphery of the virtual tooth row. In planetary gearing with two central gears, if $\alpha_v =$ half the flank angle of the tooth gaps of the used virtual tooth rows, $\alpha =$ half the flank angle of the teeth of the planet gear, $(\alpha_v - \alpha)_m =$ half the difference between the flank angle of the used virtual tooth row, on the one hand, and the flank angle of the planet gear, on the other hand, at a location $m$, $Z_1 =$ the number of teeth of a first central gear, $Z_2 =$ the number of teeth of a second central gear, $m =$ the number (ordinal number) of the tooth under consideration, as counted from a location $\Delta \phi = 0$ (note FIG. 3)

$T_{max\ v} =$ the maximal pitch (spacing of the tooth gaps) of the virtual tooth row, $T_{min\ v} =$ the minimal pitch (spacing of the tooth gaps) of the virtual tooth row, then both of the following equations are valid:

$$(\alpha_v - \alpha) = 360° \cdot \left(\frac{1}{Z_1} - \frac{1}{Z_2}\right) \cdot m \tag{1}$$

$$\frac{T_{min\ v}}{T_{max\ v}} = \frac{1}{1 + \tan\frac{(90 - \alpha)}{Z_1 + Z_2}} \tag{2}$$

The tooth row of the planet gear has given flank angles $2\alpha$ and a given pitch $T$ (spacing of the teeth), which is, for example, the mean value between $T_{max\ v}$ and $T_{min\ v}$. From the equations (1) and (2), it is inferred that the deviation or variation of the tooth flank angle of the virtual tooth row from the tooth flank angle of the planet gear as well as the deviation or variation of the pitch or spacing of the virtual tooth row (varying between $T_{max\ v}$ and $T_{min\ v}$) from the (constant) pitch or spacing of the planet gear become all the greater, the greater the difference there is between the numbers of teeth $Z_1$ and $Z_2$ of the central gears. For this reason, the difference between the numbers of teeth of the central gears lies sensibly between one and six. Higher differences in the numbers of teeth would lead to deviations or variations which would not be controllable at reasonable engineering costs.

A favorable value for the difference in the numbers of teeth is $\Delta Z = 2$. For medium and high reduction ratios (for example, over 30), the virtual addendum or crown curve is, from a practical standpoint, nearly a circle having a center of mass located eccentric to the central axis of the central gears by about half the height of a tooth of the planet gear. If two virtual tooth rows are used, the virtual addendum or crown curve is formed of two circles that have been shifted away from one another.

The feature that the teeth of the planet gear, on both sides thereof, areally or flatly engage the flanks of the used virtual tooth row is realizable in various ways:

(a) through a constant pitch or spacing (within the tolerances) of the virtual tooth row; this constant pitch or spacing can be largely attained for high reduction ratios, the flank angles of the teeth of the central gears and of the planet gear as well as the diameters thereof being suitably selected; or (b) for non-uniform pitch or spacing of the virtual tooth row through peripheral and/or radially shiftable device and/or elastic formation or development of the teeth of the planet gear; this means no elastic formation or development of the planet gear per se.

For high reduction ratios, for example over 40, and for a small difference $\Delta Z$ between the numbers of teeth of the central gears, the addendum circles connecting the points of the tooth gaps of the central gears to one another coincide. For a lower reduction ratio, however, such as under 40, for example, and for a greater difference $\Delta Z$ (greater than 2) between the numbers of teeth of the central gears, the teeth of the central gears differ in the height thereof to an extent that a common addendum circle would result in much too great a difference $T_{max\ v} - T_{min\ v}$. In this case, it is advantageous, in order to achieve a practically constant pitch or spacing of the virtual tooth row, to dispose the tooth rows of the central gears so that they are halved in the level of a circle i.e. the central gears have different diameters. Thereby, for smaller reduction ratios, the difference $T_{max\ v} - T_{min\ v}$ is reduced to such an extent that it lies within the limits of manufacturing tolerances, and individual teeth of the planet gear are disengaged from the virtual tooth row.

For medium and high reduction ratios (for example, over 30), the virtual addendum or crown curve is capable of being discribed with sufficient accuracy by a circle or an otherwise closed curve path or trend line, the tangents of which from point to point of the curve path continuously change the direction thereof. For low reduction ratios, somewhat between 10 and 30, it has been found, however, that the virtual addendum or crown curve through such "smooth" or "jog-free" or "kink-free" curves can no longer be approximated with sufficient accuracy. On the contrary, the virtual addendum or crown curves, as explained in greater detail hereinafter, are formed of circular segments, which are either mutually connected by straight lines into which the circular segments run, or merge into one another in intersecting points (inflection points or curve breaking points) wherein the tangents to the curve path unsteadily vary the direction thereof.

For reduction ratios between 10 and 30, special problems occur which, for higher reduction ratios are adjustable yet with relatively simple means, such as elasticity of material, for example, or lie within the frame or limits of the tolerances. These special problems which occur for reduction ratios between 10 and 30 are explained hereinafter:

During the rotary movement of the cam disc, half of the teeth of the planet gear moves radially outwardly whereas the other half of the teeth of the planet gear move radially inwardly. If complete engagement of the teeth of the planet gear on the flanks of the virtual tooth row is always to be assured, (a) the teeth moving radially outwardly must have identically the same velocity $+\nu$, and (b) the teeth moving radially inwardly must have identically the same velocity $-\nu$.

The radial movement of the teeth should also take place with constant velocity ($+\nu$ or $-\nu$) i.e. without acceleration.

It has furthermore been shown that, within the range of lower reduction ratios, the tooth gaps or spaces of the virtual tooth row have such variable flank angles (note Equation 1) and spaces or divisions (note Equation 2) that, with realtively simple means (such as elasticity of material or the hereinafter described free mobility of the teeth of the planet gear, for example) the soughtafter flat engagement of the teeth of the planet gear on the flanks of the virtual row of teeth cannot be assured. Finally, for lower reduction ratios, the hereinaforedescribed deviations of the virtual addendum or crown curve from an ideal "smooth" curve with which the direction of the tangents over the periphery continuously varies. Such deviations could also occur, for example, if the tooth flanks of the central gears were not flat.

Due to such deviations of the virtual tooth row with respect to the tooth row of the planet gear in the spacing or division and in the flank angle as well as due to deviations of the virtual addendum or crown curve from an ideal form, the accurate flat engagement of the teeth of the planet gear at the flanks of the virtual tooth row is impaired. For higher reduction ratios, these deviations lie within the frame or limits of manufacturing tolerances and of the flexibility of the material, and can therefore practically remain disregarded.

A special objective arises to permit the use of the invention also for lower reduction ratios without impairing the flat engagement of the teeth of the planet gear at the flanks if the virtual tooth row.

This objective is in accordance with another feature of the planet gearing of the invention in that the cam disc has a contour or outline which, in mathematical sense, is similar to the virtual addendum or crown curve, wherein locations, at which the direction of the tangents vary unsteadily or irregularly, are rounded, and wherein, between the virtual addendum or crown curve and the contour or outline of the cam disc, the planet gear, the teeth thereof as well as the bearing (such as rollers, for example), which transmits the forces thereof, are disposed, and in that the teeth of the planet gear are independently shiftable radially from one another in peripheral direction and/or radially and/or are elastically deformable and possess a variable flank angle which matches the flank angle of the virtual tooth row.

Due to the rounding of the contour or outline of the cam disc at those locations thereof at which the virtual addendum or crown curve has locations of unsteadiness in the tangential direction, exactly at these locations the respective tooth of the planet gear thereat is not forced into the virtual tooth row. Since, precisely this tooth experiences the greatest acceleration from $+v$ to $-v$, by uncoupling this tooth out of the virtual tooth row, the disturbing effect upon the smooth course of movement is eliminated. This uncoupling is also effected through the hereinaforementioned variable diameter of the central gears.

The periodic variation in the spacing or divisions of the virtual tooth row over the periphery that is revealed in Equation 2 is balanced or equalized in that the teeth of the planet gear are independently shiftable relative to one another in peripheral direction and/or radially and/or are elastically deformable. The difference $T_{max\ v} - T_{min\ v}$ is thereby a measure of the required peripheral mobility of the teeth of the planet gear.

Periodic variations of the flank angle of the virtual tooth row are balanced or equalized by a variable flank angle of the teeth of the planet gear.

The tooth moving in the region of the rounded-off locations is reversed in the radial movement thereof. In order that it does not thereby disturb the rotary motion, there is provided, in accordance with an added feature of the invention, of the internally toothed central gears, that gear with the greatest number of teeth has the smallest foot circle i.e. the circle that connects the feet of the teeth, while, of the externally toothed central gears, that gear with the greatest number of teeth has the greatest foot circle. Thereby, the tooth of the planet gear located in the region of the rounded-off location is held only by the tooth flanks of the central gear with the greatest number of teeth and does not promote the torque transmission between the central gears. It is sufficient to ensure a mobility or pivotability of the teeth and a variability of the flank angle in order to assure the flat engagement of the teeth of the planet gear against the flanks of the virtual tooth row.

In accordance with yet another feature of the invention, the teeth of the planet gear are moreover variable in height and spring-biased in direction toward the virtual addendum or crown curve. In the case of two or more internally toothed central gears, the virtual tooth row is disposed farther outwardly than is the planet gear so that the teeth of the planet gear are spring-biased outwardly. When employing teeth of variable height, the tooth flanks of the teeth of the central gears are not required to be absolutely flat as was indicated in the introduction hereto under Points A to D.

As a favorable value of the difference in the number of teeth of both central gears, the number two was mentioned hereinbefore. To achieve lower reductions, desirable constructional possibilities arise from the tooth-number difference $\Delta Z = 4$. Basically, the same reduction can be effected with the tooth-number difference $\Delta Z = 4$ as with the tooth-number difference $\Delta Z = 2$, when the number of teeth are doubled; for the same diameter of the gearing, teeth that are half as high are then obtained.

The virtual addendum or crown curve is composed of circular arcs about a center of a circle and is calculable, if the tooth flanks of the central gears are flat, from and equation of the following type:

$$r_v = r \cdot \left[ 1 - \frac{\sin(\Delta\phi)}{2 \tan\alpha_v} - \Delta s \right] \quad (4)$$

in which:
$r_v$ = spacing of one tooth space point (at the location $m$) of the virtual tooth row from the central axis 60 of the central gears,
$r$ = radius of the foot circle of the central gears with respect to the central axis 60,
$\Delta \phi$ = angular difference (peripheral spacing) of the tooth space points of the central gears at the location $m$, calculated from Equation (1) and (3),
$2 \alpha_v$ = flank angle of the tooth space of the virtual tooth row at the location $m$, according to Equation (1)
$\Delta s$ = spacing of the straight connecting lines between the tooth space points called ($\Delta \phi$) of the central gears from the foot circle 56, note "Detail 52–54 in FIG. 3".

If the tooth numbers of both central gears differ by $\Delta Z = 4$, four centers $M_1$, $M_2$, $M_3$ and $M_4$ of circles are obtained, the center of mass of which is located in the center point of both central gears. If the tooth numbers of both central gears differ by $\Delta Z = 2$, we then have three centers $M_1$, $M_2$ and $M_3$ of circles, in accordance with Equation (4) and must distinguish two instances:

(a) The teeth of the planet gear mesh (FIGS. 1 and 12) with only one virtual tooth row. The common center of mass of the three centers $M_1$, $M_2$, and $M_3$ of circles is located eccentrically to the central axis of both central gears.

(b) The teeth of the planet gear mesh (FIG. 16) with both virtual tooth rows whereby respectively less than half of the teeth of the planet gear meshes with the one or the other virtual tooth row. The common center of mass of the four centers of circles ($M_1$ and $M_3$ of the one virtual tooth row and $M_1$ and $M_3$ of the other virtual tooth row) is located on the central axis of both central gears.

If the common center of mass of the centers of circles is located on the central axis of the central gears, for example $\Delta Z = 4$; or $\Delta Z = 2$ when using a pair of virtual tooth rows i.e. the immediately hereinaforegoing case (b), thus the cam disc is advantageously formed of two halves with a circular outline or contour adjustable relative to one another, the contour of each half extending, respectively, over somewhat less than a half circle, the center of the circular outline or contour being located in the center of mass in that one of the point pairs $M_1 - M_2$ or $M_3 - M_4$ adjacent one another, which is more remote from the respective outline or contour. The bipartite construction of the cam disc permits the production of the individual parts with relative slight precision because, due to the adjustment of the parts, any inaccuracies that may exist can be equalized or compensated for during installation. It is also possible, during the adjustment, to achieve a given matching or accommodation of the teeth of the planet gear to the virtual tooth row and to effect a subsequent adjustment, as soon as signs of wear appear.

According to Equation (4), virtual addendum or crown curves of the virtual tooth row that are to be calculated also materialize for higher reductions, but agree, however, practically with simpler curves, such as circles, for example, within the manufacturing tolerances. Within the range of lower reduction ratios discussed herein, the more accurate curve form of the Equation (4) is to be taken into account through the use of a bipartite cam disc.

The invention also relates to special advantages, namely to make the teeth of the planet gear independent of one another and shiftable in peripheral direction, to provide them with a variable flank angle or to make them spring-loadedly shiftable in radial direction, as well as advantageous structural details of the planet gear and a bearing band disposed between the planet gear and the force transmitting bearing.

The planet gear is capable of being made especially simply out of sheet metal by zig-zag-formed bending. The zig-zag formed bent sheet metal is simply placed around the cam disc. Welding at the butt location is not necessary because the zig-zag formed sheet metal does not have to transmit any forces in peripheral direction.

In most slowly running adjusting gearing, it is sufficient if the zig-zag formed sheet metal, which, in this case, solely forms the planet gear, it seated directly on the cam disc. The relative motion occurring in adjusting gearing between the cam disc and the zig-zag formed sheet metal forming the planet gear, produces only slight frictional forces which are not disruptive. In more rapidly running gearing, contrarily, the zig-zag formed sheet metal is seated on a ring which is mounted with rollers or balls on the cam disc.

Of special importance is another construction, in accordance with the invention, wherein, instead of one zig-zag-like bent sheet metal, at least two are used lying one on top of the other and forming the teeth of the planet gear. A tooth row of high elasticity and strength is obtained thereby. The advantage of such a "multi-layered" zig-zag metal sheet is comparable to the advantage offered by a multiwire cable against a steel rod of the same cross section.

The cam disc is mounted in the planet gear, for example by means of the force-transmitting rollers, the planet gear, on its part, being mounted in the virtual tooth row. In order to avoid a redundancy in determination with respect to the bearing, the cam disc is connected only force-lockingly with the drive shaft, not form-lockingly i.e. besides the bearing in the planet gear, no other bearing is necessary.

In accordance with a concomitant feature of the invention, at least two coaxial cam discs are disposed on a common drive shaft and, respectively, carry a planet gear; at least three internally toothed central gears are couplable through engageable clutches with the drive shaft; the teeth of the first central gear facing the drive shaft mesh with the teeth of the first planet gear facing the drive shaft; the teeth of the third central gear facing the driven shaft meshes with the teeth of the second planet gear facing the driven shaft; and the middle central gear carries two rows of teeth of which one row meshes with the teeth of the planet gear adjacent the drive shaft and the other row meshes with the teeth of the planet gear associated with the driven shaft. By engaging or disengaging different clutches, the most varied reduction ratios can be realized. The invention also relates to various constructional details of the control gearing, such as the numbers of teeth of the various central gears, for example, and the possibility of realizing a retrograde or reverse motion.

Other features which are considered as characteristic for the invention are set forth in the appended claims.

Although the invention is illustrated and described herein as embodied in planetary gearing, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings, in which:

FIG. 1 is a radial sectional view of FIG. 32 taken along the line I—I in the direction of the arrows showing an embodiment of the planetary gearing according to the invention wherein two of the internally toothed central gears are shown having different numbers of teeth, and employing only one virtual tooth row;

FIG. 2 is a fragmentary radial sectional view similar to that of FIG. 1 showing another embodiment of the planetary gearing with two of the externally toothed central gears having different numbers of teeth;

FIG. 3 is a diagrammatic, radial quarter sectional view of the periphery of a planetary gearing with two central gears having a tooth number difference of four;

FIG. 3A is an enlargement of Section IIIA of FIG. 3.

FIGS. 4 to 7 are various diagrammatic views of details of the planetary gearing showing the disposition of the teeth of the planet gear between tooth flanks of the virtual tooth row;

FIGS. 8 to 15 are schematic views and plot diagrams, where clearly applicable, explaining the deviation of the virtual addendum or crown circle from the "smooth" form and the rounding off in the respective kink or jog locations;

FIG. 16 is a schematic radial sectional view of a gearing with a tooth number difference of two and employing a pair of virtual tooth rows.

FIG. 17 is a half longitudinal sectional view of part of a gearing according to the invention;

FIG. 17a is table of values which, together with FIG. 17, serves for explaining the reduction ratio;

Figure 18:
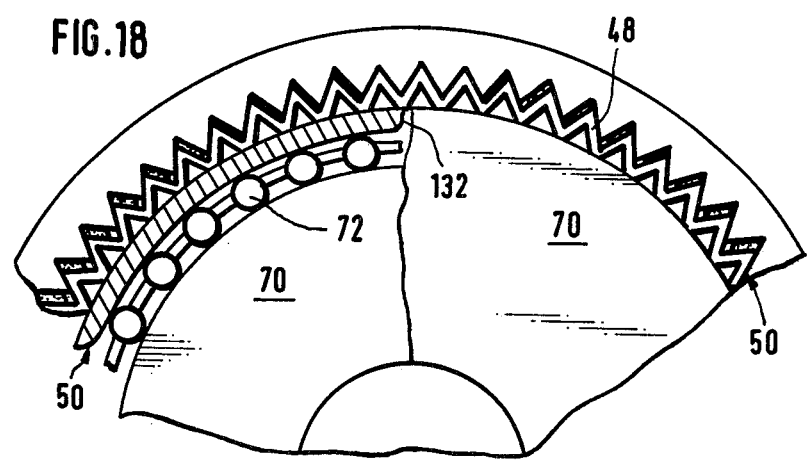
Figure 19:
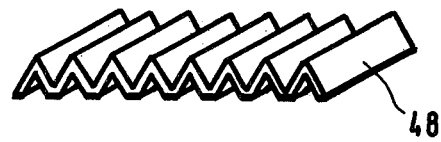
Figure 20:
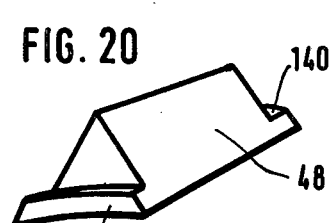
Figure 21:
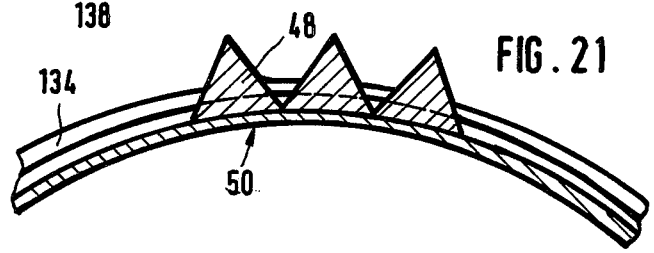
Figure 22:
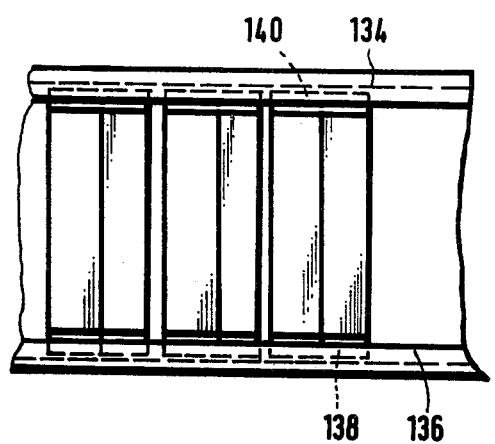
Figure 31:
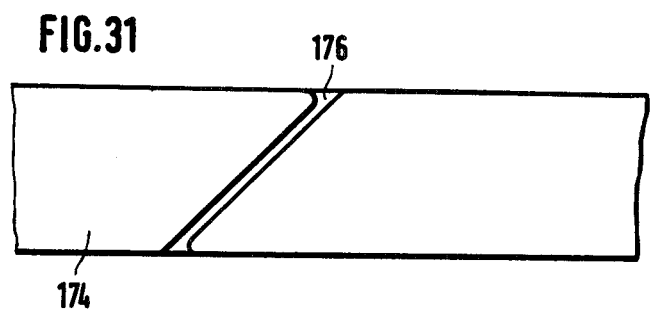
Figure 34:
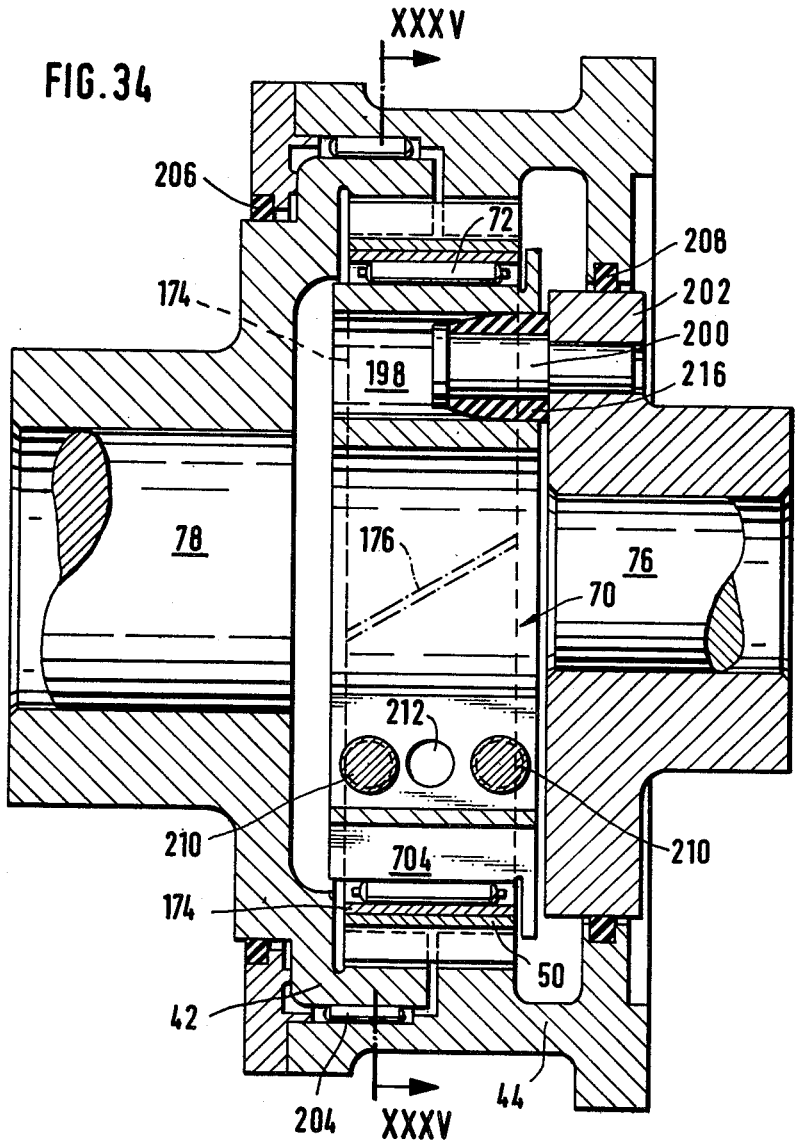
Figure 35:
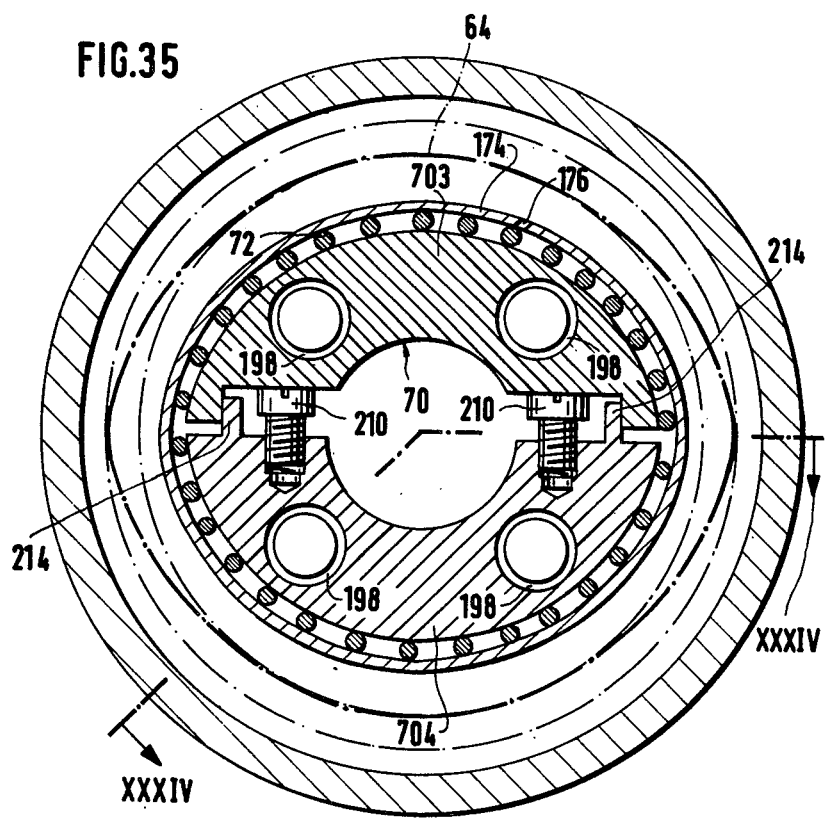
Figure 36:
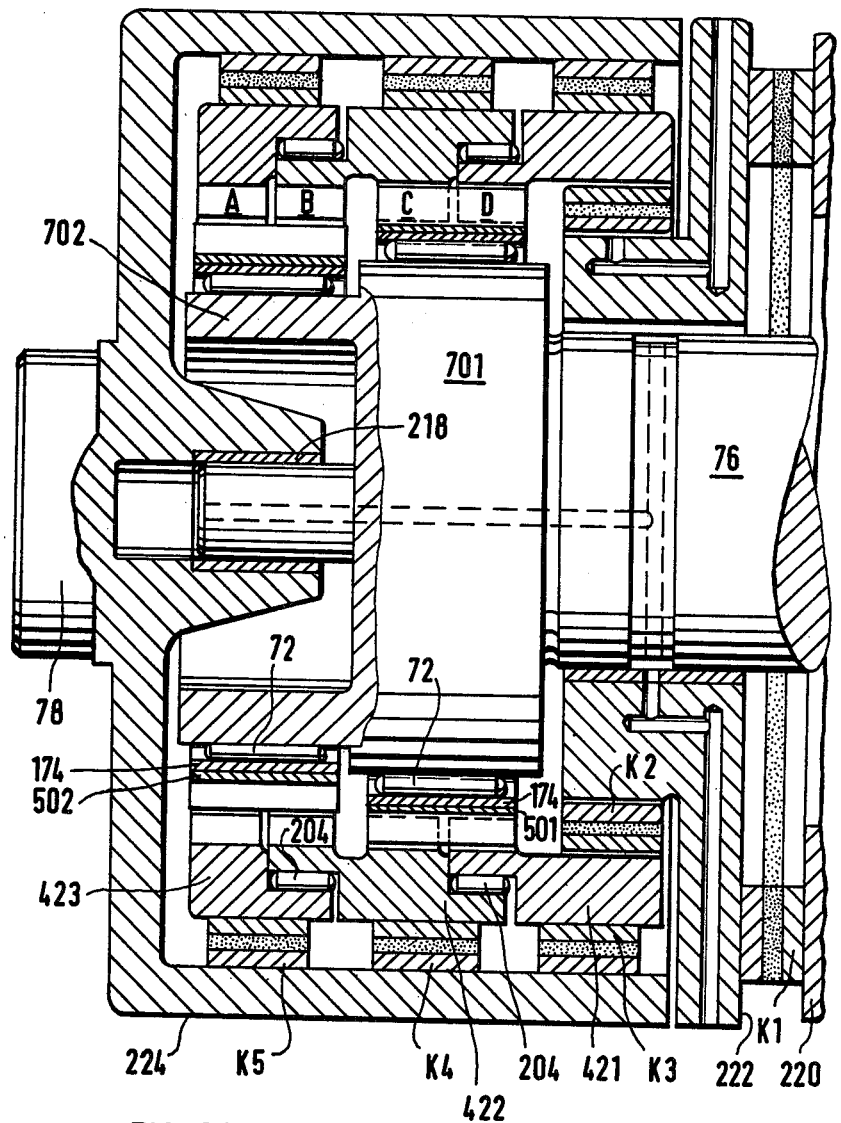

FIG. 18 a partial radial sectional view of a planet gear according to the invention showing the tooth row thereof in the form of a zig-zag metal sheet;

FIG. 19 is a perspective view of part of the zig-zag metal sheet of FIG. 18;

FIGS. 20, 21 and 22 are respective perspective, sectional and top plan views of the shiftable disposition of teeth on the planet gear;

FIGS. 23 to 29 are sectional views of various constructions of the teeth of the planet gear;

FIG. 30 is a quarter radial sectional view of a planetary gearing according to the invention;

FIG. 31 is a fragmentary enlarged plan view of the bearing band formed with a slit;

FIG. 32 is a longitudinal sectional view of the planetary gearing of FIG. 1;

FIG. 33 is a radial sectional view of a gearing similar to that of FIG. 1;

FIG. 34 is a longitudinal sectional view of FIG. 35 taken along the line XXXIV—XXXIV in the direction of the arrows;

FIG. 35 is a radial sectional view of FIG. 34 taken along the line XXXV—XXXV in the direction of the arrows; and FIG. 36 is a longitudinal sectional view of a control gearing constructed in accordance with the invention.

Referring now to the drawings and first particularly to FIGS. 1 and 32 thereof, there is shown therein a planetary gearing constructed in accordance with the invention and having two internally toothed central gears 42 and 44. According to the cross-sectional view shown in FIG. 1, the internally toothed central gear 42 is disposed behind the internally toothed central gear 44, as viewed into the plane of the figure. For this reason, the flanks of the teeth of the central gear 42 are covered in part by the teeth of the forward central gear 44 and, where visible, are illustrated in broken lines in FIG. 1.

In the right-hand upper quadrant of FIG. 1, only the teeth 46 of the internally toothed central gear 44 are shown. It is apparent in the view of FIG. 1 that the zig-zag lines formed by the flanks of the tooth rows of the internally toothed central gears 42 and 44 overlap in such manner that two virtual tooth rows are formed. Of the two tooth virtual rows, the "utilized" row is accentuated because the outer teeth 48 of a planet gear 50, shown stippled in FIG. 1, engage therein or mesh therewith. It is noted especially in the left hand side of FIG. 1, that yet a second virtual tooth row is formed which is not utilized in FIG. 1. This second virtual tooth row corresponds identically with the first-mentioned virtual toothed row, except that it is offset, however, by a given angle. Instead of the first-mentioned utilized virtual toothed row of FIG. 1, the second virtual tooth row therein could be utilized, only the rotary sense or direction thereof being changed. Hereinafter, discussion is had only with respect to a virtual tooth row which is utilized. The teeth of all of the gears have a triangular cross section and substantially flat flanks.

Tooth gap points or tooth space points 52 and 54 of the internally toothed central gears 42 and 44 are disposed on a foot circle 56 having a center 58 which is the point of intersection of the common central axis 60 of both internally toothed central gears 42, 44, as viewed into the plane of the figure. The tooth gap points 62 of the virtual tooth row, contrarily, lie close to an addendum or crown curve 64 substantially having the shape of a circle which is hereinafter referred to as "virtual addendum or crown circle" or quite generally as "virtual addendum or crown curve". The center 66 of the virtual addendum circle 64 is the point of intersection of the rotational axis 68 into the plane of the drawing of FIG. 1. The rotational axis 68 is offset from the center 58 of foot circle 56. During rotation of the planet gear 50, the center 66 (the rotational axis 68) describes a circle about the center 58 (the central axis 60).

It is also apparent in FIG. 1 that the outer or external teeth 48 of the planet gear 50 engage in the "tooth gap" of the virtual tooth row in a manner that the points or tips of the outer teeth 48 of the planet gear 50 press forward up to the tooth gap points 62 of the virtual tooth row. The height of the outer teeth 48 of the planet gear 50 is about double the spacing between the centers 58 and 66.

A cam disc 70 is disposed within the planet gear 50; rollers 72 are proved as force-transmitting bearings between the cam disc 70 and the planet gear 50 in order to facilitate the rotation of the planet gear 50 with respect to the cam disc 70.

The rearward central gear 42 of the illustrated gearing, as viewed into the plane of FIG. 1, has seventy-eight teeth 74, whereas the forward central gear 44 possesses slightly more, namely eighty teeth 46. The externally toothed planet gear 50 carries seventy-nine teeth 48, the width of which (perpendicular to the plane of the drawing) is great according to FIGS. 6 and 7 that they mesh with both internally toothed central gears 42 and 44. According to FIG. 32, the internally toothed central gear 42 is held stationary; in this case, only a drive of the cam disc 70 by the drive shaft 76 is involved. The internally toothed central gear 44 is connected with the driven shaft 78. The rotation of the cam disc 70 about the central axis 60 effects a rotation of the planet gear 50, the outer teeth 48 of which are braced in the teeth 74 of the firmly held internally toothed central gear 42. From the aforementioned number of teeth (78 and 80) of the central gears 42 and 44, respectively, there is given, independently of the number of teeth of the planet gear 50, from the equation $$i = Z_2/(Z_1 - Z_2),$$

(a) either a reduction ratio of 39, which means that for 39 revolutions of the drive shaft 76, the drive shaft 78 makes one revolution, (b) or a reduction ratio of 40 with reversed rotary sense if the other central gear is held stationary.

FIG. 2 shows a gearing according to the invention with a tooth count difference of two. Two externally toothed central gears 82 and 84 are surrounded by an internally toothed planet gear 90 which is, in turn, surrounded by a hollow cam disc 86, the central gear 82 being disposed behind the central gear 84 as viewed in direction into the plane of the drawing of FIG. 2. The tooth rows of the externally toothed central gears 82 and 84 overlap to two virtual tooth rows, in one of which the inner or internal teeth 88 of the planet gear 90 mesh. In the left-hand part of FIG. 2, the internal teeth 88 of the planet gear are formed from a zig-zag metal sheet which is shown in perspective view in FIG. 19. In the right-hand side of FIG. 2, on the other hand, another embodiment of the internal teeth 88 is shown. Obviously, in a planet gear, only an embodiment of the internal teeth will be used.

During rotation of the hollow cylindrical cam disc 86, the internal teeth 88 press into the virtual tooth row and thus effect mutual relative rotation of the central gears 82 and 84. It is apparent that a gearing according to FIG. 2 with externally toothed central gears 82 and 84, that are surrounded by the internally tooth planet gear 90, is constructed and functions, in principle, in the same manner as a gearing with internally toothed central gears 42 and 44 which surround an externally toothed planet gear 50 as in FIG. 1.

Therefore, to explain and describe the planetary gearing of the invention hereinafter, a gearing with internally toothed central gears and at least one externally toothed planet gear according to FIG. 1 are used. The explanations and descriptions obviously apply also to planetary gearing that are constructed in accordance with FIG. 2.

FIG. 3 shows schematically in section a quadrant of a gearing according to the invention. The gearing of FIG. 3 is constructed substantially like the gearing according to FIG. 1 and accordingly possesses two internally toothed central gears 42 and 44. Regions of the internally toothed central gear 42, are covered by the central gear 44 and therefore represented by a partially broken zig-zag line. The central gear 44 is not covered and is therefore represented by a solid zig-zag line. Both rows of teeth of the internally toothed central gears 42 and 44 form two virtual tooth rows. The external teeth 48 of the planet gear mesh with or engage in the virtual tooth rows.

The gaps or spaces of the virtual tooth row which is utilized are indicated by ordinal numbers $m$, counting from a location $m=0$ at which $\alpha = \alpha_v$ (note: Equation 1). A single rigid tooth 48 with a flank angle $2\alpha$ is illustrated in a tooth gap or space in FIG. 3; it is noted that the flank angle $2\alpha_v$ of the virtual tooth row is greater than $2\alpha$. If such a tooth 48 were illustrated in each tooth gap or space, it would be apparent that the smaller $m$ is, the smaller the difference is, and when $m=0$, the difference has completely vanished. If a tooth having a flank angle $2\alpha$ that is elastically variable is used instead of the rigid tooth 48, an optimal adjustment or matching of the tooth row of the planet gear to the virtual tooth row is attained. Such adjustable or matchable teeth are shown in FIGS. 2, 18 and 30 as well as FIG. 33.

The peripheral angular difference $(\Delta\phi)_m$ between the location $m$ of the virtual tooth gaps or spaces and the location $m$ of the associated tooth of the planet gear is equal to have the angular deviation of the flanks at the same location $m$ as derived from Equation (1):

$$(\Delta\phi)_m = (\alpha_v - \alpha)m:$$

In this regard it is noted that:

$$\phi_v - \phi = \alpha_v - \alpha \quad (3)$$

wherein
- $\phi$ = angular distance of the vertical tooth bisector of one tooth of the planet gear from the location $m=0$, and
- $\phi_v$ = angular distance of the vertical tooth bisector of the corresponding tooth of the vertical tooth row from the location $m=0$ The virtual addendum or crown curve 64 of the utilized virtual tooth row is a circular segment having a center M4 which lies in the quadrant at the upper right-hand side of FIG. 3. In the right side, non-illustrated quadrant of the gearing, this virtual addendum curve is a circular segment of the same radium from the center M1 of the circle which lies in the upper, left-hand side quadrant. The respective circle centers M2 and M3 (note: the description with respect to FIG. 13) are shown for the non-illustrated lower half of the gearing.

The circle centers M1, M2, M3 and M4 have equal spacing from the center of mass of the contour or outline of the planet gear and from the center of mass of the contour or outline of the cam disc, both centers of mass being simultaneously the point of intersection of the central axis 60 of both central gears 42 and 44 through the plane of the drawing of FIG. 3. The spacing of each individual point of the virtual addendum or crown curve 64 from the center of mass at the location $m$ is calculated according to the following equation:

$$r_v = r \cdot \left[ 1 - \frac{\sin(\Delta\phi)}{2\tan\alpha_v} \right] - \Delta s$$

wherein:
- $r_v$ = spacing of a tooth gap point 62 (at the location $m$) of the virtual tooth row from the center of mass,
- $r$ = radius of the foot circle 56 of the central gear, with reference to the center of mass,
- $\Delta\phi$ = angular difference (peripheral spacing) of the tooth gap point 52 and 54 of the central gear at the location $m$, calculated in accordance with Equations (1) and (3),
- $2\alpha_v$ = flank angle of the tooth of the virtual tooth row at the location $m$ (in FIG. 3 at $m = 4$),
- $\Delta s$ = the spacing of the straight connecting line, located between the tooth gap point 52 and 54 of the central gear and identified as $(\Delta\phi)$, from the foot circle 56 (note: "Detail 52-54 in FIG. 3).

The following relationship also holds for the angle $\beta_v$ which is enclosed by the radius $r_v$ and a radius $r_4$ (the spacing of the tooth gap point 62 from the center point M4) about the circle center M4 (in FIG. 3 or M1 or M2 or M3) of the respective circular section of the virtual addendum or crown curve 64:

$$\beta_v = \arcsin\left[\frac{\cos\alpha_v}{\frac{Z_1}{Z_2}} \cdot \left( \pm \sqrt{\sin^2\alpha_v + \left(\frac{Z_1}{Z_2}\right)^2 - 1} - \sin\alpha_v \right)\right] \quad (5)$$

The virtual addendum or crown curve is able to be calculated from Equation (5) equally as well as from Equation (4).

$\beta_v$ is also, at the respective location $m$ under consideration, the angle between the tangent to the foot circle 56, on the one hand, and the virtual addendum or crown curve 64, on the other hand. Therefore, $\beta_v$ is also referred to as "inlet angle" or "outlet angle" with which the virtual tooth row runs into the tooth rows or runs out therefrom.

The outline or contour 96 of the cam disc 70 is similar in a mathematical sense to the virtual addendum or crown curve 64 i.e. the spacing thereof from the virtual addendum or crown curve 64 is constant. The left-hand side contour line 96/4, which is associated with the circle center M4, intersects at the kink or inflection point 98 with the right-hand side contour line 96/1 having the point M1 as its center point. Due to the intersection of the circular contour lines 96/4 and 96/1 at the inflection point 98, there is formed thereat a point of the contour lines wherein the direction of the tangents to the contour 96 varies non-uniformly. This is the point wherein the contour or outline is rounded off so that the tooth 48 of the planet gear present at this location is not pressed into the virtual tooth row but, rather, is movable in radial direction. The rounded portion 100 indicated in phantom extends advantageously over several virtual tooth gaps.

FIG. 4, which shows a detail of FIG. 3, illustrates diagrammatically and schematically, the kinematic principle, based upon which, the gearing of the invention of the instant application operates.

The tooth 48 of the planet gear engages, on the one hand, the flank of the tooth 46 of the forward central gear 44 and, on the other hand, the respective flank of the tooth 74 of the rearward central gear 42, as viewed into the plane of the drawing of FIG. 4. Both tooth rows form one with the other the virtual tooth row, the tooth gap point 62 of which coincides with the point of the tooth 48, as long as the latter point is not flattened or rounded off in conventional manner.

The teeth 46 and 74 act upon the tooth 48 with forces indicated by the arrows 102 and 104. These forces are broken down into peripheral force components 106 and 108 and into a radial force component 110. It is evident that the peripheral components 106 and 108 cancel each other out with the result that no forces act upon the tooth 48 in peripheral direction. On the one hand, this produces or effects the automatic blocking action and, on the other hand has as a consequence thereof that the planet gear is not required to overcome any forces in peripheral direction thereof and can therefore be given a rather thin or narrow, elastic and interrupted construction or can be provided with individual teeth shiftable in peripheral direction without thereby impairing or interfering with the transmissibility of torque to the central gears and with the durability or life-span thereof. Only the radial force component 110 acts upon the tooth 48 and presses it against the planet gear. These radial force components are, for example, transmitted over the rollers 72 to the cam disc 70 and canceled due to the oppositely directed force in accordance with the arrow 114.

Since the planet gear has to absorb similar forces from all the teeth 48 and therewith from all radially directions all around, these forces are extensively canceled, so that the drive shaft of the cam disc 70 is not stressed in bending, and the structural components (central gears, planet gear) are centered one within the other.

FIG. 5 diagrammatically and schematically illustrates a detail of FIG. 3 in the vicinity of the locations $M=4$ and $m=5$. The teeth 74 marked with crosses and belonging to the rearward central gear are partly covered by the teeth 46 of the forward central gear as viewed in a direction into the plane of the drawing. Two diagrammatically represented teeth 48 of the planet gear engage in both virtual tooth gaps or spaces $m=4$ and $m=5$. It is apparent, initially, that an exact meshing and an exact mutual engagement of the flanks is possible only if both teeth 48 are pivotable independently of one another and are variable in elevation or height.

Both teeth 48 of the planet gear are shown, on the one hand, in the solid-line position or phantom-line thereof and, on the other hand, in a broken-line position. In the latter position, they are inserted so far into the virtual tooth row as would correspond substantailly to the positions $m=0$ and $m=1$ of FIG. 3. The spacing of the teeth 48 in the solid-line position is the division T, whereas the division in the phantom-line position is the division $T_v$. The ratio of the maximal division $T_{max\ v}$ to the minimal division $T_{min\ v}$ is given by Equation (2) and is a measure for the required peripheral mobility of the teeth 48 of the planet gear.

During the movement from the solid-line to the phantom-line positions, the tooth 48 slides along the flanks of the teeth 46 and 74 and, like a wedge, forces these teeth apart. With a conventional planetary gearing, on the other hand, the tooth of the planet gear rolls off on a single tooth flank of a central gear.

Figure 6:
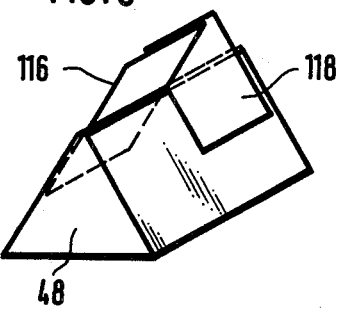

In FIG. 6, a tooth 48 of the planet gear is shown diagrammatically in perspective. This tooth 48 meshes with the indicated tooth flanks 116 and 118 of the respective teeth 46 and 74 of the central gears.

Figure 7:
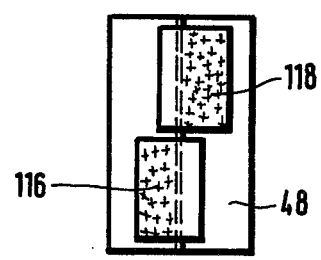

FIG. 7 is a plan view of FIG. 6, areas of the tooth flanks 116 and 118 which flatly engage the tooth 48 being marked with little crosses.

FIGS. 8 to 15 show the direction of the virtual addendum or crown curve from a "smooth" form and the necessity for the rounding off at the kinks or inflection points.

In FIGS. 8 and 9 as well as FIGS. 12 to 15, the foot circle 56 of the central gears is set with points 0, 1, 2, 3, 4, 5 and 6 distributed equi-angularly thereon. In order to avoid obliterating details of the figures, only a single common foot circle 56 for two internally toothed central gears is shown. The possibility of having a pair of separated foot circles 561 and 562 for two internally toothed central gears is apparent from FIGS. 30 and 33. The center point 58 of the foot circle 56 lies on the central axis 60 of the central gears.

In FIG. 8, a curve path 641 in the form of an inner circle is furthermore indicated, which represents the virtual addendum or corwn curve under the (not strictly correct) assumption that this virtual addendum or crown curve is exactly circular.

FIG. 10 shows, starting from the point 0, the spacing between the foot circle 56 and the curve (or circle) path 641 for the points 1, 2, 3, 4, 5 and 6. These spacings follow a sine curve. Since the contour of the cam disc 70, 86 of a planetary gearing in mathematical sense must be constructed similar to the virtual addendum or crown curve, the radial velocity of the individual teeth differs when the angular velocity of the revolving cam disc is constant. Neglecting or ignoring the teeth at the points 0 and 6, however, it is thus assumed that the teeth located thereat are out of engagement or unmeshed from the virtual tooth row, so that, as shown in FIG. 10, the curve path between the points 1 and 5 are represented practically by a straight line. The spacings between the foot circle 56 and the curve (or circle) path 641 vary in the region between the points 1 and 5, thus nearly proportionally to the peripheral angle $\phi$. For a constant angular velocity of the revolving cam disc, practically constant radial velocity of the individual teeth, which is desirable, is produced in this case.

FIG. 9 shows two inner circles having respective center points 122 and 124. These circles are connected at the right-hand and the left-hand sides thereof by straight lines 126, the lengths of which are equal to the spacing between the center points 122 and 124. A respective upper and lower half of the circles forms, together with both straight lines 126, a closed curve path 641 in such manner that tangents applied thereto continuously vary the direction thereof. In the case of higher reduction ratios, for a tooth count difference of four, a cam disc similar to the curve path 641 of the virtual addendum or crown curve is practically utilizable.

FIG. 11 is a view associated with FIG. 9 in a similar manner as FIG. 10 is associated with FIG. 8.

Figure 12:
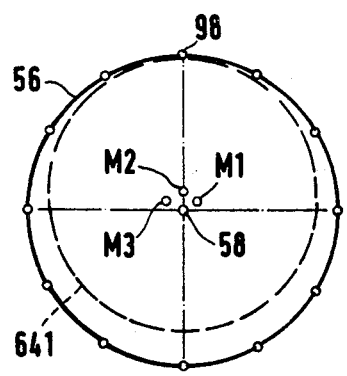
Figure 13:
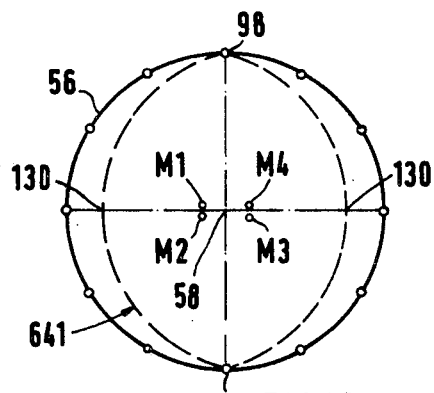

For lower reductions, in the range between $i=10$ and $i=30$, the curve paths 641 shown in FIGS. 8 and 9 must be replaced by the curve paths 641 shown in FIGS. 12 and 13, which is given by Equation (4). In both FIGS. 12 and 13, the center point 58 is the point of intersection of the central axis of both central gears through the plane of the drawing.

Using Equation (4), with a tooth count difference of the central gears of two, the three circle centers M1, M2 and M3 shown in FIG. 12 are obtained. The circle center M2 is the center of a circular segment which extends over barely the lower half of the curve path 641. The circle center M1 disposed in the quadrant at the upper right-hand side of FIG. 12 is the center of a circular segment which lies substantially in the quadrant of the curve path 641 located at the upper left-hand side of FIG. 12. In contrast thereto, the circle center M3 lying in the quadrant at the upper left-hand side of FIG. 12 is the center of the circular segment which lies in the quadrant at the upper right-hand side of that figure. Both circular segments, which are associated with the circle centers M1 and M3, intersect in the upper kink or inflection point 98 and merge without any kink or inflection point into the lower circular segment which is associated with the circle center M2. This curve path is shown in broken lines in FIG. 14 together with the solid-line curve (or circle) path 641 of FIG. 8. The deviation is noted which, for a selected reduction ratio of about 6, can definitely play a role, and as well for higher reduction ratios up to 30. The corrections in accordance with the invention of the instant application are significant within this range; because of that, the curve path of the virtual addendum or crown curve is so close to a circle, that it is sufficient, for the most part, to provide the cam disc of the planetary gearing with a circular contour or outline.

The kink or inflection point 98 is that point of FIG. 3, wherein the rounding-off portion 100 is applied (note: FIG. 3).

The curve path 641 according to FIG. 12 is, roughly speaking, somewhat pear-shaped i.e. somewhat wider at the bottom than at the top. FIG. 13 shows the formation of the curve path 641 for the tooth count difference of four. In the quadrant at the upper left-hand side of FIG. 13, the curve path 641 is a circular segment with circle center M4 which lies in the quadrant at the upper right-hand side of FIG. 13. In the quadrant at the upper right-hand side of FIG. 13, the curve path 641 is a circular segment having a circle center M1 which lies in the quadrant at the upper left-hand side of the figure. In the quadrant at the lower right-hand side of FIG. 13, the curve path 641 is a circular segment having a circle center M2 lying in the quadrant at the lower left-hand side of the figure. In the quadrant at the lower left-hand side of FIG. 13, the curve path 641 is a circular segment having a circle center M3 lying in the quadrant at the lower right-hand side of the figure. The segments which are associated with the circle center points M3 and M2 intersect in a lower kink or inflection point 98. The segments which are associated with the circle center points M1 and M4 intersect in an upper kink or inflection point 98. The segments which are associated with the circle center points M4 and M3 are connected by a short straight line 130, the length of which is equal to the spacing between the circle centers M1 and M2.

Figure 14:
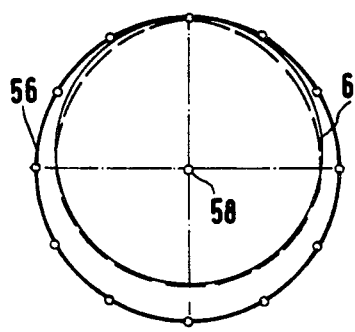
Figure 15:
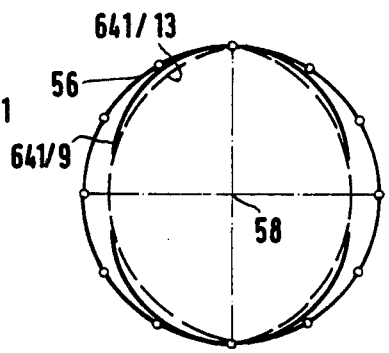

FIG. 15, similar to FIG. 14, shows a comparison of a simplified curve path 641/9 (in solid lines) of the virtual addendum or crown curve, according to FIG. 9, with the complex curve path 641/13 (in broken lines) according to FIG. 13. It is noted that the deviations increase with increasing tooth count difference.

The "pear-shaped" curve path 641 of the virtual addendum or crown curve results in a gearing as shown in FIG. 1 and with which the revolving axis of the planet gear lies eccentrically to the central axis 60 of the central gears. This results in a loading or stressing of the drive shaft due to a bending moment. If this bending load or stress is to be avoided, the construction of FIG. 16 is selected.

From the curve path 641 of the virtual addendum or crown curve shown in FIG. 12, the upper section which is associated with the circle centers M1 and M3 is used. From the non-illustrated addendum or crown curve of the other virtual tooth row, which is offset 180° from the first-mentioned virtual tooth row, that non-illustrated curve portion which is associated with the non-illustrated circle centers of this second virtual tooth row is used. Thus, the same as in FIG. 13, four circle centers and, therewith, a curve path composed of four circular arcs are obtained. By using both virtual tooth rows, in accordance with FIG. 16, a cam disc can be used as shown in FIGS. 34 and 35.

In the diagrammatically illustrated gearing in FIG. 16, the central gears have a tooth count difference $\Delta Z = 2$. The cam disc 70 carries a zig-zag shaped metal sheet as a planet gear.

FIG. 17 shows diagrammatically the mutual association of the four structural components of the invention, namely, a pair of internally toothed central gears 42 and 44, an externally toothed planet gear 50 and the cam disc 70. In the table of FIG. 17a, there is specified which part (70 or 42 or 44) is driven, which part (42 or 44 or 50 or 70) is held stationary, and which part (42 or 44 or 50) can be connected to the driven shaft.

The rotary direction is indicated by an arrow in the column "Drive". In the column "Reduction", there is found, in addition to the reduction ratio, the rotary direction of the driven shaft, also indicated by an arrow; if the latter arrow is in the same direction as the arrow in the column "Drive", then it is being driven in the same rotary sense; if the arrow in the column "Reduction" is opposite in direction to the arrow in the column "Drive", then the driven shaft is being driven in a rotary sense opposite that in which the drive shaft is driving.

For the calculation of the reduction ratios in the column "Reduction", the following tooth counts were assumed:

central gear 42 — $Z_{42} = 80$
central gear 44 — $Z_{44} = 78$
planet gear 50 — $Z_{50} = 79$.

FIG. 18 is a view similar to that of the left-hand side of FIG. 2; FIG. 19 is a view of part of a zig-zag shaped bent metal sheet. The individual upwardly projecting spikes of the sheetmetal, as viewed in FIG. 19, form the teeth 48 of the planet gear 50 (at the right-hand side of FIG. 18), when the sheetmetal that is bent into the zig-zag shape is placed about the cam disc 70. The teeth 48 then engage in or mesh with the virtual tooth row, as do the teeth 88 of FIG. 2. The direct placement of the zig-zag shaped, bent metal sheet on the cam disc 70 is possible with adjusting drives because, with the latter, due to the relative rotary motion of the parts, friction that may occur is negligible. For more rapid rotary motions, the structure shown in the left-hand side of FIG. 18 is advantageously selectable. Therein, the zig-zag shaped, bent metal sheet is seated on a ring 132 and forms therewith the planet gear 50. The ring 132 is mounted by means of roller bearings 72 on the cam disc 70 in a manner that, during movement of the ring 132 relative to the cam disc 70, only minimal friction occurs.

A zig-zag shaped, bent metal sheet according to FIGS. 18 and 19 has the same advantage as the elastically and bendably constructed planet gear of the right-hand half of FIG. 2. When there is non-uniform division of the virtual tooth row, the zig-zag formed, bent metal sheet offers thereby not only the advantage of being manufacturable relatively easily and inexpensively, but also, of being able to equalize or compensate for the non-uniform division of the virtual tooth row.

A possibility of providing a shiftable dispostion of the teeth on the planet gear is shown in FIGS. 20, 21 and 22.

According to FIG. 21 (a partial side elevational, partial sectional view) and FIG. 22 (a top plan view), the planet gear 50 is provided with lateral guides 134 and 136 (for example, in the form of rings), which are overlapped by projections 138 and 140 of the teeth 48. The tooth 48 shown in perspective view in FIG. 20 is thereby shiftable in peripheral direction of the planet gear 50.

FIG. 23 shows a section of a planet gear 50 which is formed with bores 142 that extend in axial direction through the entire planet gear. Alternatingly, the bores 142 are open at the periphery thereof at one and the other side, respectively of the planet gear. Such a planet gear can change its dimensions in peripheral direction within given limits (such as 5% for example) and thereby match or accommodate to the cam disc. In the bores 142 of the planet gear that are open to the outside, a pair of resilient sheetmetal strips 144 having a substantially double-S cross section are received in such manner as to form a spring in the shape of a figure-eight in cross section that is divided, respectively, at the top and bottom. The lower section of the spring can pivot about a small angle in the bore 142. The upper section thereof carries a tooth 48, the flank part 168 of which is formed with an inner circular recess 146 which engages around the rounded upper part of the spring in a manner that the tooth 48 can pivot on the spring. The recesses 146 have gripping traction to prevent the teeth from falling out.

Such a mounted tooth has numerous degrees of freedom in the plane of the drawing of FIG. 23:

1. The turning of the spring in the planet gear and of the tooth on the spring permits a variation of the angle between the tooth bisector lines 148 and the planet gear (the curved double-headed arrow 150 in the spring of the tooth on the left-hand side of FIG. 23).

2. The yieldability of the upper part of the spring that engages in the tooth simultaneously permits a variation of the flank angle $2\alpha$ and the height or elevation $h$ of the tooth; a desired dependence of the height $h$ upon the variation or change of the flank angle $2\alpha$ is adjuatble by suitable dimensioning.

The construction shown in FIG. 23 thus permits the matching or accommodation of the tooth row of the planet gear to the virtual tooth row which is formed of the tooth rows of the internally toothed (or externally toothed) central gears.

FIG. 24 shows a relatively short section of a planet gear 50 with a pivotable bearing of a tooth 48 formed with a slot 178 extending in the region of the tooth bisector 148. The planet gear 50 has a concave cylindrical surface serving as a pivot bearing bed 152 of the tooth 48. If the center of curvature of the concave cylindrical surface 152 were identical with the point 154 of the tooth 48 (the rounding off thereof being ignored in this regard), then every swing of the tooth in the directions of the double-headed arrow 50 would effect no change in the height of the tooth. If the center of curvature of the concave cylindrical surface 152 should, however, be located outside the point 154, every swing of the tooth 48 then effects a change in the height thereof. Through suitable selection of the curvature of the concave surface 152, any desired relationship between the change in the height of the tooth and the swinging thereof in direction of the double-headed arrow 150 can be achieved. Moreover, just as for FIG. 23, there is produced obviously a dependence between the height of the tooth and the tooth flank angle thereof.

According to FIG. 25, the planet gear 50 is formed with semi-cylindrical recess 146. A cylindrical spring 156, which is open at a location 158 thereof, is received in the recess 146. A tooth 48 having two flank parts 168 that are connected at the top thereof, as viewed in FIG. 25, is seated on the spring 156, just as it is seated on the spring metal sheets 144 in FIG. 23. Such a construction is less costly than the bipartite, complex spring of FIG. 23. It has the disadvantage similar to that of the construction of FIG. 23, however, that the tooth can fall out of the housing thereof. This is avoided by the "tooth clip" 160 which, laterally of the teeth of the central gears and around the entire planet gear, connects the teeth 48 of the planet gear to one another.

The left-hand part of FIG. 2, as well as FIGS. 18 and 19, teaches that the teeth of the planet gear can be found of a zig-zag shaped, bent metal sheet. A given variability of the flank angle, a given variability of the height of the teeth, as well as a given mobility or shiftability in peripheral direction are thereby attained beforehand. A disadvantage of such a simple zig-zag shaped metal sheet is that the teeth are not completely independently shiftable from one another in peripheral direction. It is sufficient, however, that if only every second tooth of the planet gear is available, a construction according to FIG. 27 is utilizable. This is formed also of a bent metal plate or sheet; a section of the metal sheet is bent triangularly to a tooth 48, the next succeeding section is bent into an arc 162 acting as an articulating joint, that is so low that it does not engage in the corresponding gap or space of the virtual tooth row, the then following section is again bent into a tooth 48, the succeeding section again into an arc 162, and so forth. Such a bent metal sheet formed as a tooth row of the planet gear, only every second (or possibly every third or fourth) tooth of which is present, and hinge-like arcs 162 being inserted therebetween, is especially inexpensive to produce and adequately satisfies the requirement for an independent mobility or shiftability of the individual teeth 48 in peripheral direction.

Quite generally, it should be noted that, for large diameters, not all teeth of the planet gear must be present; it is sufficient, for example, if only every third tooth is present. A considerable economy in the production thereof is thereby realizable.

Figure 28:
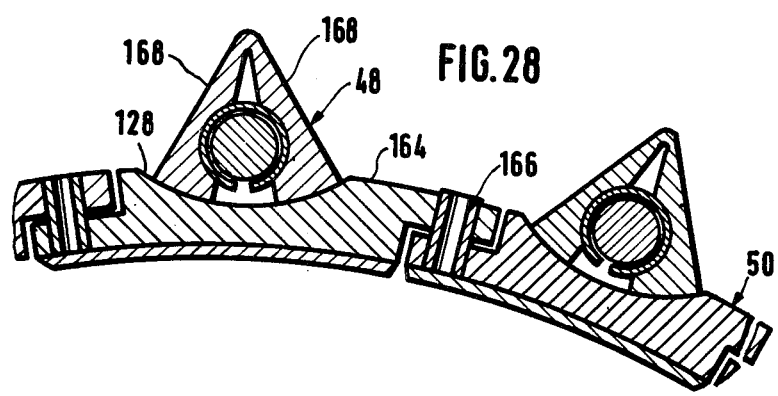

FIG. 28 shows a section of a planet gear which is formed of individual guide shoes 164 that are held together by resilient cylinder pins 166 in such manner that they are capable of moving slightly toward one another in peripheral direction. Every guide shoe 164 is formed with a radially outer concave surface 128 following, in cross-section, a circular line, the tooth 48 being seated on the respective concave surface 128. The concave surface is curved in a manner that the center of curvature is disposed in the point of the tooth 48. If the tooth 48 accordingly shifts on the concave surface 128, the location of the point and the height thereof, accordingly, thus remain unchanged, and only the orientation of the tooth 48 to the guide shoe 164 varies.

Figure 29:
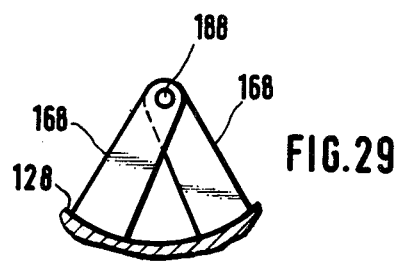

The tooth 48 of FIG. 28, like that of FIGS. 23 to 26, is formed of two flank parts 168. FIG. 29 shows a tooth, both flank parts 168 of which are connected hinge-like to one another by means of a pin 188 disposed in the region of the tooth point.

FIG. 30 shows a quarter of a gearing, in radial section, similar to that of FIG. 3 except that in FIG. 30, however, the cam disc 70, the rollers 72 serving as force-transmitting bearings, the planet gear 50, the teeth 48 of the planet gear, as well as both central gears 42 and 44 are fully illustrated. In the gearing shown in FIG. 30, the tooth count difference of both central gears is four, and the reduction ratio 1:15. The high proportion of the illustrated teeth that are in mesh is readily recognizable. The planet gear 50 is variable in length in the peripheral direction thereof, because it is formed with bores 142 extending perpendicularly to the plane of the drawing of FIG. 30 in a manner similar to that for the planet gear of FIG. 23. Moreover, the planet gear of FIG. 30 is split at the interruption locations 170 in order to prevent the formation of internal stresses, for example, due to temperature variations. The opened interruption location 170 of the planet gear is loosely held together by a strap lock 172, shown in broken lines; the strap lock 172 being constructed similarly to the lock of a bicycle chain except that it is resiliently flexible or yieldable in peripheral direction, however.

During the introduction of force through the rollers 72, a bearing band 174, such as a steel belt, for example, is inserted between the rollers 72 and the planet gear 50 so that the rollers 72 do not penetrate into the bores 142 facing toward them. This bearing band 174 is formed with a slot 176 so that the periphery thereof can vary (for example, with temperature variations) without arching or buckling. The slot 176 extends at an inclination across the bearing band 174, so that the rollers 72, which extend in direction of the central axis, do not penetrate into the inclined slot 176 (note FIG. 31).

The individual teeth 48 of the planet gear in FIG. 30 are mounted in the same manner as those described with respect to FIG. 24. In this regard, the center of the concave cylindrical surface 152 forming the pivot bearing bed is located exactly in the respective points 154 of the teeth, so that the height of the teeth do not change when the teeth pivot in the pivot bearing bed 152. Matching or accommodation of the direction of the teeth 48 to the direction of the tooth gaps or spaces of the virtual tooth row is thereby attained (if one considers that the term "direction" of a tooth or of a tooth gap or space is that of the tooth bisector 148).

In addition, as in FIG. 24, the teeth 48 of FIG. 30 are formed, respectively, with a slot 176. What is achieved thereby is that the tooth flank angle matches the angle of the virtual tooth gap or space; if the tooth flank angle increases, the height of the teeth 48 then decreases, if the tooth is compressed, however, into a smaller tooth flank angle, the tooth then becomes higher. Through suitable dimensioning, adjustment to a desired relationship between both of these variations is able to be effected. FIG. 30 accordingly shows all of the degrees of freedom that may be given to the tooth 48 of the planet gear 50 so that it adjust optimally to the virtual tooth row. It is, moreover, also possible to make the teeth of the central gears 42 and 44 somewhat pivotable or swingable. To this end, elongated recesses 180 are formed in the forward central gear 44 and permit connection of tooth foot 182 to the body 186 of the central gear 44 only through a narrow bridge 184. The bridge 184 acts as a joint about which the respective tooth of the central gear 44 can swing or pivot slightly. The same feature is applicable to the teeth of the rearward central gear 42 but is not illustrated in FIG. 30 in the interest of maintaining the clarity thereof. Both tooth rows of the central gears 42 and 44 are disposed in such a manner that those circles which bisect the teeth in height coincide in a circle 80. A consequence thereof is that the radii of the foot circles 56$_1$ and 56$_2$ of the central gears 42 and 44 are different. The central gear 44 with the greater tooth count (lesser division) has the smaller foot circle 56$_2$. During rotation of the cam disc 70 about the central axis 60, the teeth 48 of the planet gear are introduced with constant radial velocity into the virtual tooth gaps or spaces. Due to the pivotability of the teeth 48 in the pivot bearing beds 152 and due to the slots 178 formed in the teeth, an optimal matching to or accommodation of the virtual tooth row is achieved. The elasticity of the planet gear 50 is also conducive to the compensation for or equalization of the varying division of the virtual tooth row.

The inner contour or outline of the planet gear 50 forms a kink or inflection point 98. At the corresponding location thereof (note FIG. 3), the cam disc 70 has a rounded-off section 100 which does not exactly correspond in form to the inner contour of the planet gear 50. This rounded-off section 100 prevents the rollers 72 from running over a tooth point, which would have resulted in the respective tooth having an insecure support.

The rearward central gear 42 has the greater foot circle 56$_1$. The tooth gap points thereof, which are shown in broken lines, thus extend (to the foot circle 56$_1$) farther outwardly than do the solid-line tooth gap points of the forward central gear 44 which extend only to the smaller foot circle 56$_2$. The planet gear 50 rotates in direction of the arrow 112 i.e. counterclockwise as viewed in FIG. 30, so that positions 190, 192, 194 and so forth are run through in succession. The deeply inserted tooth is located in the position 192 out of contact with the flanks of the rearward central gear 42. From the position 192 to the position 164, the tooth gap point of the rearward central gear 42 shifts through an amount $\Delta\phi$ with respect to the solid-line tooth gap point of the forward central gear 44. In the position 194, the tooth 48 of the planet gear is disposed with the flank at the right-hand side thereof at both flanks at the left-hand side of the central gears 42 and 44; in the position 190, the tooth 48 is disposed with the flank at the left-hand side thereof at both flanks at the right-hand side of the central gears 42 and 44. During the movement through these three positions in direction of the arrow 112, the tooth 48 thus changes from the tooth flank at the right-hand side to the tooth flank at the left-hand side of the rearward central gear 42 and, in the intermediate position 192, it is in meshing engagement only with one central gear, namely the forward central gear 44 which has the smaller foot circle, and in fact owing to the rounding-off section 100 cooperating with the different foot circles. The course of movement during the reversal of the direction of movement of the tooth 48 is thereby not disrupted. Due to the central gear 44, the tooth 48 remains prestressed and passes virtually free from losses again to the central gear 42 when the spring or resilient energy of the tooth 48 has run out.

FIG. 31 is a top plan view of a section of the bearing band 174 that is formed with the slot 176 aforementioned with respect to FIG. 30.

FIG. 32 shows in a longitudinal sectional view the gearing according to the invention which is shown in cross sectional view along the line I—I in FIG. 1. FIG. 33 shows a further embodiment in a view that could have been taken along the line I—I in FIG. 32 i.e. a view corresponding to that of FIG. 1.

FIG. 33 shows a true-to-scale radial cross sectional view of a gearing according to the invention having a reduction ratio of ten; in a single-stage construction, such a small reduction ratio is practically the realizable critical or borderline case. Just as in FIG. 30, the foot circles 56$_1$ and 56$_2$ of the central gears 42 and 44 are different. The virtual addendum or crown curve 64 is displaced or dislocated by an eccentricity E with respect to the center 58. The planet gear 50 is slotted at the interruption location 170 and is per se covered with a slide layer 196 at the inside thereof. The teeth 48 are pivotally mounted in the planet gear in a manner similar to that in FIG. 30. They can therefore be accommodated exactly to the virtual tooth row.

Also, in this embodiment, it is sufficient if both central gears 42 and 44 are mounted in the planet gear; it is unnecessary to mount one central gear in the other central gear. The cam disc 70 is advantageously driven through an elastic coupling.

A gearing system such as is shown in FIGS. 34 and 35 has proven to be practical. FIG. 34 is an axial cross sectional view of FIG. 35 taken along the line XXXIV—XXXIV in the latter, and FIG. 35 is a radial sectional view of FIG. 34 taken along the line XXXV—XXXV therein.

The closely batched cam disc 70 of FIG. 35 is formed of two halves 703 and 704 and is provided with four coupling bores 198 wherein respective coupling pins or bolts 200 are received. An end of the respective bolts 200 projects into a suitable recessed flange 202 of the drive shaft 76 (note FIG. 34).

The cam disc 70 carries the bearing band 174 on rollers or needle bearings 72. The bearing band 174 is formed with an inclined slot 176 (note FIGS. 30 and 31). The bearing band 174 is surrounded by the planet gear 50, the teeth of which mesh with the teeth of both central gears 42 and 44. The central gear 42 at the left-hand side of FIG. 34 is mounted on a bearing 204 in the central gear 44 at the right-hand side of that figure; the central gear 42 being rigidly connected to the drive shaft 78. Seals 206 and 208 provide for the sealing of the gearing from the outside (note FIG. 34).

The tooth count difference of both internally toothed central gears 42 and 44 is four. In order to avoid the obstruction of details in FIG. 35, the planet gear and the teeth thereof, which are adjustable in accordance with the previously described figures, are not illustrated in FIG. 35. Only the virtual addendum or crown curve 64 is shown in (heavy) dot-dash lines. The addendum curve 64 is similar to the curve path 641 of FIG. 13. With regard to the rounded-off portion 100 of FIG. 3, the cam disc 70 according to FIG. 35 can be produced from two semicircular halves 703 and 704. The spacing between both semicircular halves 703 and 704 is adjustable by two screws 210, which are shown in plan view in FIG. 34 and in diagrammatic longitudinal sectional view in FIG. 35. A fitting hole 212 visible only in FIG. 34 is located between both screws 210 for receiving therein a fitting pin through both halves of the cam disc 70, respectively above and below, in order to adjust both halves accurately. The screws 210 afford an exact adjustment of the spacing between both halves of the cam disc during assembly of the gearing; no high precision need be maintained during manufacture, accordingly, because the required accuracy of adjustment during assembly can be achieved by the adjustment of the screws 210. During subsequent wear the affected parts can be after-adjusted by means of the screws 210. Both halves of the cam disc 70 are guided toward one another at locations 214 by groove and spring.

Between the drive shaft 76 and the cam disc 70, only a force-locking, and no form-locking coupling, however, ought to be provided. For this reason, an elastic coupling is provided and, in fact, in such a manner that the coupling pins 200 carry thick rubber rings or sleeves 216, which couple the pins 200 elastically to the coupling bores 198. Other elastic couplings or tooth couplings are contemplatable.

FIG. 36 shows a control gearing in a longitudinal sectional view. A first cam disc 701 is driven by the drive shaft 76 and is rigidly connected to a second cam disc 702 disposed offset by an angle of 180° therefrom. The cam disc 702 is mounted in the bearing 218 in the driven shaft 78.

Every cam disc 701 and 702 carries, on rollers 72, a slotted bearing band 174 as well as a planet gear 501 or 502 with teeth which can match or accommodate the respective virtual tooth row, in accordance with the foregoing representations.

Three central gears 421, 422 and 423 are all mounted within one another in two layers 204. The first central gear 421 facing the drive shaft 76 meshes with a tooth row thereof in the tooth row of the planet gear 501 of the first cam disc 701. The middle central gear 422 has two tooth rows, the first of which meshes with the teeth of the planet gear 501 of the first cam disc 701, and the second of which meshes with the teeth of the planet gear 502 of the second cam disc 702. The teeth of the third central gear 423 facing toward the driven shaft 78 mesh with the teeth of the planet gear 502 of the second cam disc 702.

Altogether, five engageable and disengageable couplings K1, K2, K3, K4 and K5 are provided:

1. Through the coupling K1, a coupling ring 22 coaxially surrounding the drive shaft 76 can be coupled to the housing 220. The central gear 421 surrounds an inner section of the coupling ring 222; between both thereof, a coupling K2 is provided.

2. The driven shaft 78 is rigidly connected to a sleeve or bushing 224 which surrounds the three central gears 421, 422 and 423. Through a respective coupling K3, K4, or K5, the sleeve or bushing 224 can be coupled to one of the central gears, respectively.

In order to attain a reduction ratio between the drive shaft 76 and the driven shaft 78, at least two couplings must be engaged. As noted hereinbefore, two different possibilities of effecting reversal are realizable. Various proposals with respect to the numbers of teeth of the central gears 421, 422, and 423 have also been presented.

Various combinations of fixed and loose clutches or couplings can be derived from the following table:

| Fixed Couplings | Loose Couplings | Rotary Speeds Taken Off |
| --- | --- | --- |
| K1 | K2 | respective rotary speeds at K3,K4 or K5 |
| K2 + K3 | K1 | i = 1, no reduction |
| K1 + K2 | K3 | respective rotary speeds at K4 or K5, the rotary speed of which is opposite to the driveshaft 76 i.e. two reversals |

There are claimed:

1. Planetary gearing comprising a toothed planet gear, a pair of toothed central gears meshing with said toothed planet gear said central gears being of similar construction except that they have a respectively different number of teeth forming virtual tooth rows one with the other, and a cam disc rotatable about an axis and operatively connected with said toothed planet gear for guiding and driving the same, all of said gears having teeth of substantially triangular cross section and flat tooth flanks, each of said virtual tooth rows having tooth gap points disposed on a closed virtual addendum curve having a center of mass located on said axis of rotation of said cam disc, said teeth of said planet gear flatly engaging on both sides thereof the flanks of at least one of said virtual tooth rows, said one virtual tooth row having a pitch equal to that of the tooth row of said planet gear so that, in a limiting case, all of the teeth except for the difference in the numbers of teeth of the central gears are in force-transmitting engagement.

2. Planetary gearing according to claim 1 wherein said two central gears are internally toothed and said planet gear is externally toothed.

3. Planetary gearing according to claim 1 wherein said central gears are externally toothed, said planet gear is internally toothed and surrounds said central gears, and said cam disc is operatively connected with said planet gear from the outside thereof.

4. Planetary gearing according to claim 1 including at least another central gear meshing with said toothed planet gear.

5. Planetary gearing according to claim 4 wherein all of said central gears are coaxially disposed one behind the other, said central gears are externally toothed, said planet gear is internally toothed and surrounds said central gears, and said cam disc is operatively connected with said planet gear from the outside thereof.

6. Planetary gearing according to claim 1 wherein the number of teeth of said planet gear lies between the respective numbers of teeth of said central gears.

7. Planetary gearing according to claim 4 wherein said pair of central gears have the same number of teeth, respectively, and are disposed on both sides of a central gear having a different number of teeth.

8. Planetary gearing according to claim 1 wherein the difference in the numbers of teeth of said central gears is between one and six.

9. Planetary gearing according to claim 8 wherein the difference in the numbers of teeth of said central gears is two, and said virtual addendum curve is substantially a circle having a center disposed eccentrically to the central axis of said central gears by substantially half the height of a tooth of said planet gear, the centers of said planet gear and of the circle of said tooth gap points being mutually coincident.

10. Planetary gearing according to claim 1 wherein the difference in the numbers of teeth of said central gears is two, and wherein circles halving the teeth of said central gears in the height thereof coincide in a common circle so as to form a virtual tooth row having constant pitch.

11. Planetary gearing according to claim 1 wherein said cam disc has a contour substantially similar, in mathematical sense, to said virtual addendum curve, locations thereon, at which directions of tangents thereto vary irregularly, having rounded portions, and including bearing means disposed between said virtual addendum curve and said contour of said planet gear for transmitting the teeth as well as the force thereof, and means for adjusting the flank angle of said teeth to said virtual tooth row so as to compensate for non-uniform pitch thereof.

12. Planetary gearing according to claim 11 wherein said bearing means comprise rollers.

13. Planetary gearing according to claim 11 wherein said flank angle adjusting means comprises means for independently shifting the teeth of said planet gear in peripheral direction.

14. Planetary gearing according to claim 11 wherein said flank angle adjusting means comprises means for independently shifting the teeth of said planet gear in radial direction.

15. Planetary gearing according to claim 11 wherein said flank angle adjusting means comprises means rendering said teeth of said planet gear elastically deformable.

16. Planetary gearing according to claim 11 wherein said pair of central gears are internally toothed and said planet gear is externally toothed, that one of said central gears having the greater number of teeth having a foot circle connecting the feet of the teeth which is the smaller of the respective foot circles for the pair of central gears.

17. Planetary gearing according to claim 11 wherein said pair of central gears are externally toothed and said planet gear is internally toothed, that one of said central gears having the greater number of teeth having a foot circle connecting the feet of the teeth which is the larger of the respective foot circles for the pair of central gears.

18. Planetary gearing according to claim 11 wherein said teeth of said planet gear are variable in height and are spring-loaded in direction toward said virtual addendum curve.

19. Planetary gearing according to claim 18 wherein said tooth flanks are uneven.

20. Planetary gearing according to claim 11 wherein the tooth flanks of said central gears are flat, said virtual addendum curve being composed of circular arcs about respective centers and being calculable from an equation of the following type:

$$r_v = r \cdot \left[ 1 - \frac{\sin(\Delta\phi)}{2 \tan\alpha_v} \right] - \Delta s ,$$

wherein:

$r_v$ = the spacing of one tooth gap point (at a location m) of the virtual tooth row from the central axis of the central gears, $r$ = the radius of the foot circle of the central gears with respect to the central axis of the central gears, $\Delta\phi$ = the angular difference (peripheral spacing) of the tooth gap points of the central gears at the location m calculated from the equation:

$$\Delta\phi = (\alpha_v - \alpha)_m = 360° \cdot \left( \frac{1}{Z_1} - \frac{1}{Z_2} \right) \cdot m \quad (1)$$

where $\alpha_v$ = half the flank angle of the tooth gaps of the used virtual tooth row, $\alpha$ = half the flank angle of the teeth of the planet gear, $(\alpha_v - \alpha)_m$ = half the difference between the flank angle of the used virtual tooth row, on the one hand, and the flank angle of the planet gear, on the other hand, at the location $m$, $Z_1$ = the number of teeth of a first central gear, $Z_2$ = the number of teeth of a second central gear, and $m$ = the number (ordinal) of the tooth under consideration, as counted from a location at which $\Delta\phi = 0$;

and from the equation:

$$\phi_v - \phi = \alpha_v - \alpha = \Delta\phi \quad (3)$$

where

φ = the angular distance of the vertical tooth bisector of one tooth of the planet gear from the location $m = 0$; and $\phi_v$ = the angular distance of the vertical tooth bisector of the corresponding tooth of the virtual tooth row from the location $m = 0$;

$2\alpha_v$ = the flank angle of the tooth gap of the virtual tooth row at the location m according to the foregoing equation (1), and $\Delta s$ = the spacing of straight connecting lines between the tooth gap points called $\Delta\phi$ of the central gears from the foot circle.

21. Planetary gearing according to claim 20 wherein the center of mass of the centers of said circular arcs is located on the central axis of the central gears, said cam disc being formed of two relatively adjustable halves with a circular contour, the contour of each half extending respectively over somewhat less than a half circular arc having a center disposed in a center of mass of that pair of centers of said circular arcs, which compose said virtual addendum curve, that is more distant from the respective contour.

22. Planetary gearing according to claim 11 wherein each tooth is formed of two flank parts articulatingly connected at the point of the tooth, said flank parts having therebetween a spring element tending to bias said flank parts away from one another, said flank parts having respective free ends spaced from said planet gear.

23. Planetary gearing according to claim 11 wherein said planet gear is formed with bores extending in axial direction and being alternatingly opened to the outer and the inner side of said planet gear, respectively.

24. Planetary gearing according to claim 11 wherein every individual tooth is seated on a guide shoe, and the guide shoes being resiliently connected together to said planet gear.

25. Planetary gearing according to claim 11 wherein said planet gear is formed with a break in the continuity thereof, and including a peripherally resilient strap lock bridging said break.

26. Planetary gearing according to claim 21 wherein rollers serving as force-transmitting bearings are provided between said cam disc and said planet gear, and a bearing band is inserted between said rollers and said planet gear.

27. Planetary gearing according to claim 26 wherein said bearing band is formed with a slot inclined to the longitudinal direction of said bearing band.

28. Planetary gearing according to claim 11 wherein the tooth feet of said central gears are connected only by a narrow, bendable bridge to the body of the respective central gear.

29. Planetary gearing according to claim 11 wherein said teeth of said central gears are formed with cooling bores.

30. Planetary gearing according to claim 11 wherein said planet gear comprises a metal sheet having a zig-zag formed cross section disposed about the periphery of said cam disc and defining the teeth of said planet gear.

31. Planetary gearing according to claim 30 wherein said zig-zag formed metal sheet has a plurality of layers.

32. Planetary gearing according to claim 30 including a ring member whereon said zig-zag formed metal sheet is mounted, and anti-friction bearing means supporting said ring on said planet gear.

33. Planetary gearing according to claim 11 wherein said cam disc is mounted on bearing means therefor in said planet gear which, in turn is mounted in said virtual row only force-lockingly, said bearing means in said planet gear being the sole means for mounting said cam disc.

34. Planetary gearing according to claim 1, including at least another cam disc mounted coaxially with said first-mentioned cam disc on a common drive shaft, each of said cam discs carrying a respective planet gear, at least three internally toothed central gears being couplable through engageable clutches with said common drive shaft, a first of said central gears facing toward said drive shaft having teeth meshing with teeth of a second of said central gears, which also faces toward said drive shaft, and including a middle central gear having two rows of teeth, one of said rows of teeth meshing with the teeth of a planet gear adjacent to said drive shaft and the other of said rows of teeth meshing with the teeth of the other of said planet gears, said other of said planet gears facing toward a driven shaft.

35. Planetary gearing according to claim 34 wherein said first central gear facing toward said drive shaft is couplable by a releasable clutch to a housing for the planetary gearing.

36. Planetary gearing according to claim 35 including a clutch ring mounted on said drive shaft between said housing and said first central gear, said clutch ring being couplable through a releasable clutch with said first central gear and through a further releasable clutch with said housing.

37. Planetary gearing according to claim 36 wherein a clutch between said first central gear and said driven shaft is releasable while said clutch between said first central gear, said clutch ring and said housing is fixed so that selectively through the clutch of said third central gear and said clutch of said middle central gear, a rotation can be taken off having a rotary sense opposite that of said drive shaft.

38. Planetary gearing according to claim 34 wherein said third central gear has a number of teeth equal to the number of teeth of one of the rows of said middle central gear; the other of the rows of said middle central gear having a number of teeth equal to the number of teeth of said first central gear; and the number of teeth of said third and said first central gears are unequal.

39. Planetary gearing according to claim 34 wherein the said number of teeth of one of the rows of said middle central gear is equal to the number of teeth of the other of the rows of said middle central gear, the numbers of teeth of said first and third central gears being different from one another and from the numbers of teeth of both said rows of said middle central gear.

40. Planetary gearing according to claim 34 wherein the numbers of teeth of said first and third central gears as well as both said rows of said middle central gear are dissimilar.

41. Planetary gearing according to claim 34 wherein the largest diameter of one of said cam discs is offset with respect to the largest diameter of the other of said cam discs.

42. Planetary gearing according to claim 41 wherein the extent of offset between the largest diameters of both said cam discs is 180°.

43. Planetary gearing according to claim 34 wherein more than two cam discs are mounted on a common drive shaft, wherein the number of central gears is greater by one than the number of cam discs, and those central gears disposed between two other central gears carry two rows of teeth of which one row of teeth meshes with one planet gear, and the other row of teeth with an adjacent planet gear.

44. Planetary gearing according to claim 23 including a pair of double-S shaped spring plates received in the bored formed in said planet gear and opened to the outer side of said planet gear, said spring plate forming a figure-eight-shaped spring having a radially inner section thereof disposed in said bores opened to the outer side of said planet gear and a radially outer section thereof pivotally received in substantially circular recesses formed in said flank parts.

* * * * *